US009530251B2

(12) United States Patent
Loxam et al.

(10) Patent No.: US 9,530,251 B2
(45) Date of Patent: Dec. 27, 2016

(54) INTELLIGENT METHOD OF DETERMINING TRIGGER ITEMS IN AUGMENTED REALITY ENVIRONMENTS

(71) Applicant: AURASMA LIMITED, Berkshire (GB)

(72) Inventors: James Loxam, Cambridgeshire (GB); Sean Mark Blanchflower, Cambridge (GB)

(73) Assignee: Aurasma Limited, Bracknell (GB)

( * ) Notice: Subject to any disclaimer, the term of this patent is extended or adjusted under 35 U.S.C. 154(b) by 0 days.

(21) Appl. No.: 14/253,791

(22) Filed: Apr. 15, 2014

(65) Prior Publication Data
US 2014/0225924 A1    Aug. 14, 2014

Related U.S. Application Data

(63) Continuation of application No. 13/468,246, filed on May 10, 2012.

(51) Int. Cl.
*G06T 19/00*    (2011.01)
*G09G 5/14*    (2006.01)

(52) U.S. Cl.
CPC ............ *G06T 19/006* (2013.01); *G09G 5/14* (2013.01); *G09G 2340/12* (2013.01)

(58) Field of Classification Search
None
See application file for complete search history.

(56) References Cited

U.S. PATENT DOCUMENTS

| 6,272,231 B1 | 8/2001 | Maurer |
| 6,400,374 B2 | 6/2002 | Lanier |
| 6,563,950 B1 | 5/2003 | Wiskott et al. |
| 6,714,661 B2 | 3/2004 | Buddenmeier et al. |
| 6,845,338 B1 | 1/2005 | Willins et al. |
| 7,050,787 B2 | 5/2006 | Caci |

(Continued)

FOREIGN PATENT DOCUMENTS

GB    2436924    10/2007

OTHER PUBLICATIONS

"Augmented Reality." Wikipedia. Wikimedia Foundation, May 4, 2012. Web. May 8, 2015. <http://en.wikipedia.org/w/index.php?title=Augmented_reality&oldid=490567709>.*

(Continued)

*Primary Examiner* — Mark Zimmerman
*Assistant Examiner* — Vu Nguyen
(74) *Attorney, Agent, or Firm* — HP Inc. Patent Department

(57) ABSTRACT

The systems and methods may allow mobile computing devices to identify real world trigger items and to cause augmented reality scenarios associated with a real world trigger item to be presented on a display of the mobile computing device. A lookup scheme may identify indexed feature points of known candidate trigger items stored in a database. A number of evaluations occur between the indexed feature points to the feature points found in the real world trigger item. A determination that the feature points of a candidate trigger item matches the feature points of the real world trigger item is made when a confidence threshold is met or exceeded based on at least the look up scheme, weighted factor evaluation, variable threshold evaluation and potentially a geometric consistency evaluation to declare a positive match.

20 Claims, 10 Drawing Sheets

(56) References Cited

U.S. PATENT DOCUMENTS

| | | |
|---|---|---|
| 7,084,809 B2 | 8/2006 | Hockley et al. |
| 7,177,651 B1 | 2/2007 | Almassy |
| 7,389,526 B1 | 6/2008 | Chang et al. |
| 7,471,301 B2 | 12/2008 | Lefevre |
| 7,565,139 B2 | 7/2009 | Neven, Sr. et al. |
| 8,005,958 B2 | 8/2011 | Hannel et al. |
| 8,010,327 B2 | 8/2011 | Copenhagen et al. |
| 8,160,980 B2 | 4/2012 | Da Silva Fernandes et al. |
| 2004/0258311 A1 | 12/2004 | Barbehoen et al. |
| 2005/0055281 A1 | 3/2005 | Williams |
| 2005/0227674 A1 | 10/2005 | Kopra et al. |
| 2006/0218191 A1 | 9/2006 | Gopalakrishnan |
| 2006/0227992 A1 | 10/2006 | Rathus et al. |
| 2007/0161383 A1 | 7/2007 | Caci |
| 2008/0077952 A1 | 3/2008 | St. Jean et al. |
| 2008/0165843 A1 | 7/2008 | Dvir et al. |
| 2008/0188246 A1 | 8/2008 | Sheha et al. |
| 2008/0214153 A1 | 9/2008 | Ramer et al. |
| 2008/0268876 A1* | 10/2008 | Gelfand et al. .............. 455/457 |
| 2009/0061901 A1 | 3/2009 | Arrasvuori et al. |
| 2009/0070797 A1 | 3/2009 | Ramaswamy et al. |
| 2009/0102859 A1 | 4/2009 | Athsani et al. |
| 2009/0176520 A1 | 7/2009 | B.S. et al. |
| 2009/0232354 A1 | 9/2009 | Camp, Jr. et al. |
| 2009/0233629 A1 | 9/2009 | Jayanthi |
| 2009/0276154 A1 | 11/2009 | Subramanian et al. |
| 2009/0307091 A1 | 12/2009 | Lilley |
| 2010/0060632 A1 | 3/2010 | Lefevre et al. |
| 2010/0081458 A1 | 4/2010 | Sheynblat et al. |
| 2010/0103241 A1 | 4/2010 | Linaker et al. |
| 2010/0115114 A1 | 5/2010 | Headley |
| 2010/0194782 A1* | 8/2010 | Gyorfi et al. .............. 345/633 |
| 2010/0220891 A1 | 9/2010 | Lefevre et al. |
| 2010/0309225 A1 | 12/2010 | Gray et al. |
| 2010/0325126 A1 | 12/2010 | Rajaram et al. |
| 2011/0164163 A1 | 7/2011 | Bilbrey et al. |
| 2011/0210959 A1 | 9/2011 | Howard et al. |
| 2011/0223931 A1 | 9/2011 | Buer et al. |
| 2012/0122491 A1* | 5/2012 | Kim et al. .............. 455/456.3 |

OTHER PUBLICATIONS

Autonomy press release, "Thrasher Magazine and Aurasma Launch Comprehensive Augmented Reality Promotion for SXSW and Beyond" http://www.autonomy.com/content/News/Releases/2012/0313.en.html.

Cellan-Jones, Rory, "Aurasma: Augmented reality future or forgettable fun?", BBC Technology News, May 26, 2011, 5 pages.

Marks, Paul, "Aurasma App Is Augmented Reality, Augmented", newscientist.com, http://www.newscientist.com/blogs/onepercent/2011/05/how-thereverend-haves-will-fi.htm.

* cited by examiner

INTELLIGENT METHOD OF DETERMINING TRIGGER ITEMS IN AUGMENTED REALITY ENVIRONMENTS

RELATED APPLICATIONS

The present application is a Continuation of U.S. patent application Ser. No. 13/468,246, filed May 10, 2012, titled, "AN INTELLIGENT METHOD OF DETERMINING TRIGGER ITEMS IN AUGMENTED REALITY ENVIRONMENTS;" the disclosure of which is incorporated herein by reference in its entirety.

TECHNICAL FIELD

Embodiments of the present disclosure generally relate to the field of digital image processing, and in some embodiments, specifically relate to a probabilistic approach to detecting trigger items in augmented reality environments.

BACKGROUND

Various types of video capturing devices are available in the market today at very affordable prices. This allows many consumers the ability to capture video for any occasions at any place and any time. Typically, the content of the captured video is limited to what is visible to the operator of the video capture device. For example, when the operator is videotaping a building because of its unique architecture, what the operator sees in a viewfinder or on a display of the video capturing device are images of the same building and nothing more.

BRIEF DESCRIPTION OF THE DRAWINGS

The multiple drawings refer to embodiments of the disclosure. While embodiments of the disclosure described herein are subject to various modifications and alternative forms, specific embodiments thereof have been shown by way of example in the drawings and will herein be described in detail.

DETAILED DESCRIPTION

Figure 1:
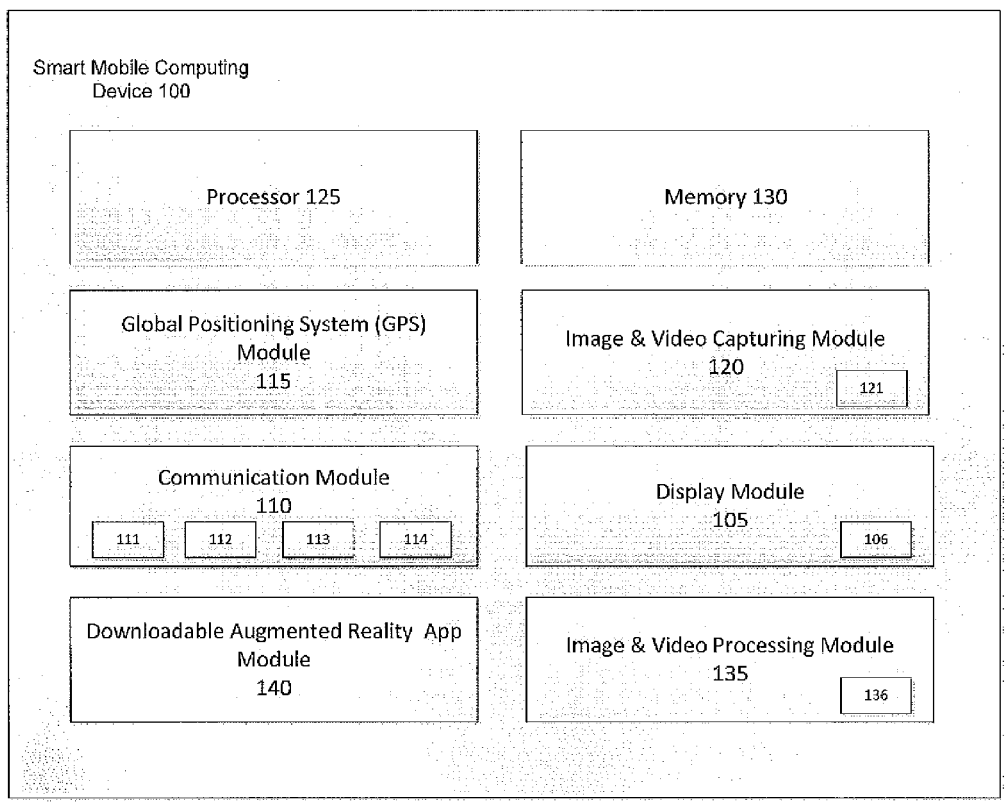
FIG. 1 illustrates a block diagram of an embodiment of an example of a mobile computing device having the download augmented reality application resident.

In the following description, numerous specific details are set forth, such as examples of specific data signals, components, types of augmented reality scenarios, etc. in order to provide a thorough understanding of the present disclosure. It will be apparent, however, to one skilled in the art that the present disclosure may be practiced without these specific details. In other instances, well known components or methods have not been described in detail but rather in a block diagram in order to avoid unnecessarily obscuring the present disclosure. Thus, the specific details set forth are merely exemplary. The specific details may be varied from and still be contemplated to be within the spirit and scope of the present disclosure.

For some embodiments, the systems and methods described here may allow an augmented reality application resident on a mobile computing device to identify real world trigger items and to cause augmented reality scenarios associated with the real world trigger items to be presented on a display of the mobile computing device. The method may include enabling the mobile computing device to capture an image in a frame or a series of frames of a video. A lookup scheme may be used to find indexed feature points of known candidate trigger items stored in a database. The indexed feature points of the known candidate trigger items are compared to match with the feature points of the real world trigger item. The method may include performing geometric consistency evaluation of the feature points of the real world trigger item based on geometric information associated with the indexed feature points of the known candidate trigger items. A weighted factor evaluation of the feature points of the real world trigger item may be performed based on characteristics of a matching known trigger item to eliminate errant matches. A variable threshold evaluation of the feature points of the real world trigger item relative to a number of indexed feature points of the known trigger item may be performed. The method may include selecting an augmented reality scenario associated with the real world trigger. The augmented reality scenario may include interactive content, stored in an augmented reality database. The augmented reality scenario may be presented onto a display of the mobile computing device by overlaying augmented reality content onto the frames of the video. The augmented reality scenario may be presented by an augmented reality application resident on the mobile computing device.

For some embodiments, a computer-aided method for selecting an augmented reality scenario for an augmented reality application resident on a mobile computing device is disclosed. The method may include capturing an image of a real world trigger item from one or more frames of a video captured by the mobile computing device. A lookup scheme may be used to identify indexed feature points of known candidate trigger items previously stored in a database. The indexed feature points of the known candidate trigger items are compared to match with feature points of the real world trigger item. The indexed feature points of the known trigger items may be compared to feature points of the real world trigger item using any combination of 1) a one-to-many approach by positively matching the feature points of the one real world trigger item with the indexed feature points of the many known candidate trigger items, 2) a many-to-one approach by eliminating one or more of the many known candidate trigger items from being a match to one real world trigger item based on distinctive characteristics of the known candidate trigger items, or 3) both. The method may include applying weighted factors using a statistical probabilistic model to evaluate an amount and kind of indexed feature points of known candidate trigger items compared to the identified feature points of the real world trigger item to eliminate errant matches. An augmented reality scenario may be selected when a confidence factor associated with identifying the real world trigger item as a match to a known candidate trigger item is met based on at least the look up scheme and applied weighted factors. The variable threshold evaluation may be performed by a detection trigger item application resident on the mobile computing device. An augmented reality scenario may be presented onto a display of the mobile computing device by overlaying augmented reality content onto the frames of the video. The augmented reality scenario may be presented by an augmented reality application resident on the mobile computing device.

For some embodiments, an augmented reality application resident in a mobile computing device cooperating with a server system connected over wide area network to determine augmented reality information to use with a captured video stream is disclosed. The augmented reality application resident in a mobile computing device may include a trigger item engine configured to index and store characteristics as well as geographical information associated with known candidate trigger items in one or more databases associated with the server system. The augmented reality application may include a trigger item detection engine configured to compare characteristics and geographical information of real world trigger items associated with one or more frames of a video to characteristics and geographical information of the known candidate trigger items. The video stream may be captured by a video module of the mobile computing device. The trigger item detection engine may be configured to perform at least two or more of 1) geometric consistency evaluation of the matching feature points between the real world trigger item captured in the frames of the video and each of the known candidate trigger items, 2) a weighted factor evaluation of the feature points of the real world trigger items that match with those of the known trigger items to positively include or eliminate potential candidate trigger items based on the weighted factor evaluation, 3) determine an aggregate amount and kind of matching feature points between the real world trigger item, and 4) any of these three. The trigger item detection engine may be configured to compare a number of the feature points of the real world trigger items that match with a total number of the feature points of the known candidate trigger items based on a variable threshold. The trigger item detection engine may be further configured to communicate wirelessly to a network and a server system. The augmented reality application may include an augmentation engine configured to provide augmented reality content overlaid onto the frames of the video in the mobile computing device. Selected augmented reality content may be overlaid onto the frames before the video stream is displayed on a display screen of the mobile computing device. The augmented reality application may consist of electronic circuits, software instructions, electronic circuits cooperating with software instructions, and any combination of the three. Any portions of the augmented reality application implemented in software may be stored on non-transitory computer readable medium, which stores instructions in an executable format by a processor.

Mobile Computing Device to Generate Augmented Reality Video Streams

FIG. 1 illustrates a block diagram of an embodiment of an example of a mobile computing device having the download augmented reality application resident. Mobile computing device 100 may include display module 104, communication module 110, global positioning system (GPS) module 115, image and video capturing module 120, processor 125, memory 130, image and video processing module 135, and one or more downloaded applications including the augmented reality application 140. The mobile computing device 100 may be, for example, a smart cellular phone, a laptop, a notebook, a touch pad, or any other similar devices. The mobile computing device 100 cooperates with the network 200 (see FIGS. 2, 3A, 3B, 4, and 9). The augmented reality application 140 uses the video processing, displaying, and capturing functionality of the mobile computing device 100 to assist in the identification of objects captured in each video frame as well as then an augmentation engine from the application inserts the augmented reality content into the frames of the video stream.

Network Environment between the Mobile Computing Devices and the Servers

Figure 2:
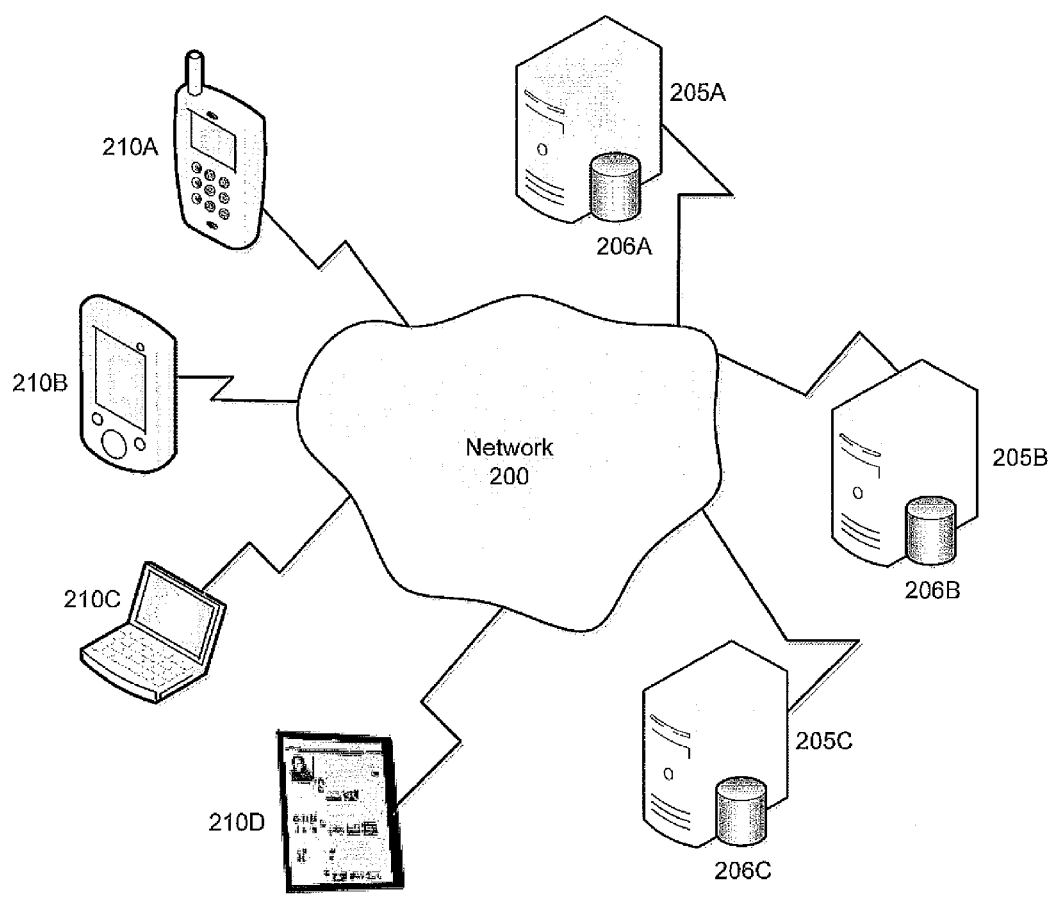
FIG. 2 illustrates a block diagram of an embodiment of an example network that may be used to add augmented reality scenarios to a captured video stream.

FIG. 2 illustrates a block diagram of an embodiment of an example network that may be used to add in augmented reality scenarios into a captured video stream. Network 200 may be the Internet. Multiple servers 205A-205C and multiple mobile computing devices 200A-200D may be connected to the network 200. Each of the servers 205A-205C may be associated with a database 206A-206C, respectively. The mobile computing devices 200A-200D may be referred to as the mobile computing devices.

Figure 3A:
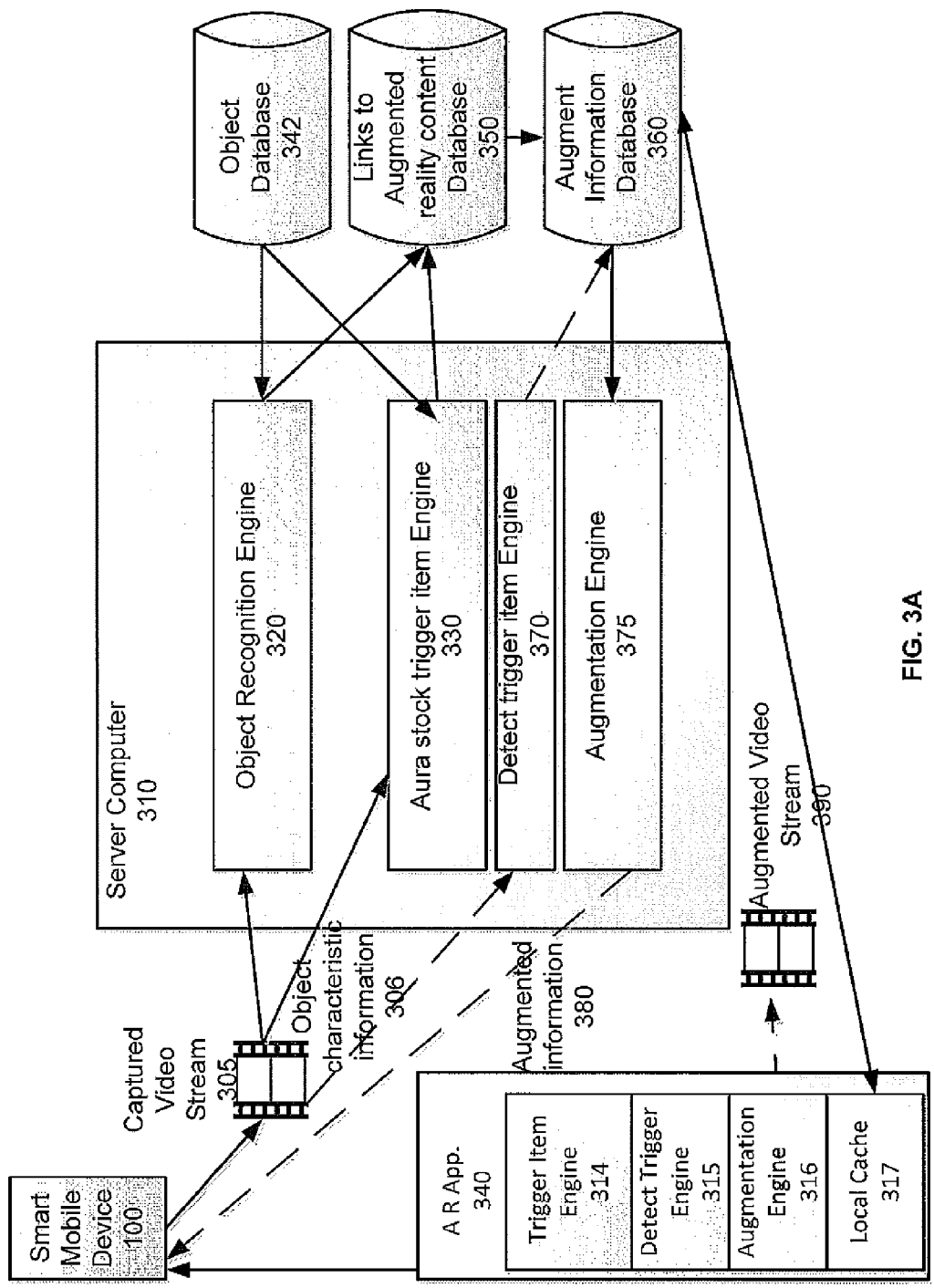
FIG. 3A illustrates a block diagram of an embodiment of an example downloaded augmented reality application resident in a mobile computing device cooperating with a server system connected over wide area network to determine what augmented reality information is to be used with a captured video stream.

FIG. 3A illustrates a block diagram of an embodiment of an example downloaded augmented reality application resident in a mobile computing device cooperating with a server system connected over wide area network to determine what augmented reality information is to be used with a captured video stream. The smart mobile computing device 300 can include the downloadable augmented reality application 340. The augmented reality application 340 may include multiple modules/engines, such as a stock trigger item engine 314, a trigger-detection engine 315, an augmentation engine 316, a local cache 317 and other similar engines and modules. These generally perform the same or similar functions as the corresponding component resident in the server system 305, or database 342, 350, 360 attached to the server system 305, as appropriate. For example, the trigger item engine 314 corresponds to the stock trigger item engine 330 and performs the same or similar functionality. Generally, however, this functionality would be performed for the instance of the augmented reality application on the specific smart mobile computing device 300 and potentially merely have a subset of the full capabilities of the similar components found in the backend server system 305. Also, at the server system 305, the functionality is generally configured to be performed for multiple instances of the application potentially at the same time.

The trigger item engine 314 may be configured to index and store characteristics and geographical information associated with potential trigger item objects. The trigger item objects may include any combination of 1) pre-determined stock objects and images maintained by an object database 342 in the backend server system 305, 2) custom objects and images selected and created by a user of this instance of the augmented reality application to be used as a trigger item, or 3) both.

The trigger-detection engine 315 detects trigger items in a video stream at the mobile device 300. The trigger-detection engine 315 identifies images and objects included in a video stream that trigger the generation of augmented reality actions and overlays. The trigger-detection engine 315 can be configured to compare current characteristics and meta data information of images and objects found in or associated with one or more frames in a first set of frames of a video stream compared to the characteristics and meta data information stored in the trigger item engine 314 in order to identify a known trigger item. The trigger-detection engine 315 is configured to process images and/or video streams captured by the video capturing module 120. The trigger-detection engine 315 may analyze the frames of the captured video stream and identify the objects/potential trigger item within each frame of the captured video stream. Identifying the points of interest for an object may include breaking the object into geometric shapes and distinctive features. The operations may apply to a set of objects with each object in the set broken down into different geometric shapes and associated distinctive features.

As discussed herein, recognition of trigger items may occur in a scalable way of combining two or more data sources including using the visual, audio, and Optical Character Recognition information as well as the geographical location, angle of the image, and other Meta data. The feature points are indexed along a hierarchical organization to improve the searching through these known feature points. Information presented by video streams is typically limited to what is visible or audible to the users such as geometric shapes, colors patterns associated with that shape, symbols and other features associated with objects in that video stream. Combining the visual information and the metadata of an image or object, such as geographical information, may allow a rapid recognition or matching to the characteristics of objects that are known and pre-stored in an object database 342. The geographical information may be provided by a global positioning system (GPS) built-into the mobile computing device. Combining the visual information with the metadata of an image or object generally reduces the amount of possible trigger items that need to be sorted through by the object recognition engine 320 and trigger-detection engine 315 to identify and recognize known objects and/or persons. For example, the rough geographical information from the GPS reduces the amount of possible trigger items that need to be sorted through as a possible match to known objects in that area. Further, direction information about where a video camera of the mobile computing device is facing when capturing the video stream is also transmitted to the server system connected over wide area network. The direction information may be provided by a built-in compass or direction sensor in the mobile computing device to the backend server system along with the features of the potential trigger item in that frame. The audio augmented reality information may be audible through the speaker of the mobile computing device 300. All of these points are analyzed by the trigger detection engine 315 on the mobile computing device 300, which attempts to identify the major features of one or more potential trigger item within each frame of a video stream captured by the video camera, and also transmits those identified features and points of interest to the server system 305. All of these features and points of information assist in reducing the sheer number of potential views to compare the characteristics information transmitted from the mobile computing device to known objects stored in a database, which makes a scalable and manageable system.

The trigger-detection engine 315 may use an extraction algorithm to identify the distinctive features of the potential trigger item in a frame and extract those features, along with the geographical information, and other relevant information. The trigger-detection engine 315 then analyzes those distinctive features locally or potentially transmits that packet of information about that frame up to the server system 305, for each frame being captured by the video camera. The trigger-detection engine 315 may generate a pattern of X-Y coordinates of the geometric shapes of the potential trigger item as well as the color associated with the shapes. The trigger-detection engine 315 attempts to match the pattern of the visually distinctive features of the potential trigger item in the frame to the known objects in the object database. The geometric shape of the features of the point of interest X-Y coordinates may come across to a human like a dot-to-dot connection illustration. When the X-Y coordinates of the dots on the grid of the paper are connected in the proper sequence, recognizing the image/object associated with those dots on the piece of paper is a simple task. This may include comparing the dot-to-dot type geometric shapes transmitted features along with their distinctive colors, recognized text, numbers and symbols, geographical information, direction information relative to the camera to the feature sets stored in the object database 340. The dot-to-dot type geometric shapes can be broken into distinctive triangles, pyramids, rectangles, cubes, circles and cylinders, etc., each with its own associated distinctive colors or patterns, to aid in the identification and recognition. The trigger item engine 314, like the stock trigger item engine 330 in the server system 305, on a hierarchical basis, may map the collection of feature points about the potential trigger item to a stored pattern of feature points for known trigger item objects to match what is in the frames to the known object. The trigger-detection engine 315 may cooperate with the trigger item engine 314 to hierarchically filter or narrow down the possible known matching images/object to the transmitted features.

The trigger-detection engine 315 may perform basic scene analysis including using optical character recognition (OCR) to extract the distinctive features of the potential trigger item within the frames of the captured video stream, code them into the small pattern of X-Y coordinates for geometric shape format with associated distinctive color and pattern information for that feature. The trigger-detection engine 315 generally identifies the geographical information of that object and other known distinctive features for that object.

For some embodiments, the potential trigger items in a frame may be related to a person. The trigger-detection engine 315 may be configured to analyze the frames of the captured video stream and identify facial characteristics or visual information of a person that may be in the center area of the frames. In some embodiments, the trigger-detection engine 315 performs the facial analysis entirely locally. For some embodiments, as the video scene is being captured by the mobile computing device 300, the video stream is transmitted to the server system 305 and analyzed by the server system 305 for facial recognition. Alternatively, the identity of the desired user is transmitted to the server system 305 and the images and different views are transmitted to the mobile computing device. Thus, the server system 305 stores the photo's for facial recognition in the facial recognition database and transmits to the mobile computing device 300 the facial recognition image/set of images front side, right side and left side profile to be matched with by the trigger-detection engine 315 making the facial recognition faster and easier by the trigger-detection engine 315 of the mobile computing device 300. It may be noted that, one or more types of rapid facial recognition software, which look at features such as skin tone, and facial features such as eyes may be incorporated into the trigger-detection engine 315.

Meta data associated with the image is very helpful as well. The trigger-detection engine 315 may extract the direction information from a compass and/or direction sensor associated with the video camera to determine the direction that the video camera is facing when capturing the frames in the video stream. The direction information provided by the direction sensor may include North, South, East, West, upward angle, downward angle, and any possible related combinations (e.g., Northwest and up 20 degrees from a horizontal plane, etc.). For some embodiments, the pattern of points used for the potential trigger items, the amount of points used, and the amounts of points of interest may be dependent on the amount of distinct potential trigger item in the frame. Non-centered or periphery objects in the frame, small objects, and non-distinctive objects can be filtered out by the extraction algorithm, while only bold and distinctive features on the potential trigger item may be extracted.

The trigger-detection engine 315 analyzes each captured frame and then their relation to each other in the video stream. The trigger-detection engine 315 may relate patterns from the series of frames to assist in determining what the potential trigger items are and are they known to the system. The trigger-detection engine 315 will initially try to match the distinct points and objects to those known in the trigger item engine 314. However, trigger-detection engine 315 can also use the backend server to assist in detecting trigger items or in the creation of a new trigger item. The trigger-detection engine 315 may relate patterns from the series of frames to assist in to enable faster transmission or even local analysis of the features of the potential trigger item. For some embodiments, no transmission of the features from a particular frame may be necessary if there is no change to the same features that were previously transmitted. For some embodiments, if a current frame includes features that are different from the previous frame, only the difference in the change of features is transmitted.

For some embodiments, the objects/potential trigger items may generally be located in the center area of the frames. It may be noted that certain consecutive frames of the captured video stream may have the same object in the center area or at least contained within the series of consecutive frames. The video processing module may analyze these frames to identify the characteristics or visual information of the object. As the video capturing module continues to capture the video stream, it may be possible that the trigger-detection engine 315 will identify many different objects.

The downloadable augmented reality application 312 brings the physical and virtual worlds together. The downloadable augmented reality application is capable of recognizing trigger items such as images, symbols, and objects in the real world and understanding them. Using the smart phone's camera, GPS, compass, accelerometer and internet connection, the technology combines image recognition and a conceptual understanding of the 3D world to recognize objects and images and seamlessly merge augmented reality actions into the scene. Without the need for barcodes or tags on potential trigger items, the augmented reality application is able to see the trigger items and their surrounding environment and make it fully interactive. For example, the trigger-detection engine 315 may recognize the distinctive features and the point of interest for a billboard or poster for a movie, a restaurant such as McDonalds®, a building such as an office, historic landmark, residence, etc.

The augmented reality application brings the physical and virtual worlds together. The augmented reality application is capable of recognizing trigger items in the real world and understanding them by breaking them down into images, symbols, objects, etc. These trigger items cause the downloadable augmented reality application to then deliver relevant content including augmented reality overlays in real time, including videos, animations, audio, or web pages.

The above operations performed by the trigger-detection engine 315 can be used to minimize the size of the file being transmitted to the server, and hasten the near real time recognition by the server system of the potential trigger item, and achieve near real time transmitting the augmented reality information to the mobile computing device 300. Rather than trying to transmit a JPEG or MPEG type file, the trigger-detection engine 315 identifies and extracts distinctive features including shapes, dot-to-dot type X-Y coordinates of the shapes, patterns colors, letters numbers, symbols, etc. associated with objects/potential trigger item in the video frame. Alternatively, breaking down these distinctive features including shapes, dot-to-dot type X-Y coordinates of the shapes, patterns colors, letters numbers, symbols, etc. allows hierarchal filtering of possible matching trigger items to allow a quicker analysis locally between the trigger item engine 314 and trigger-detection engine 315. As the transmission speeds increase, the entire images may be transmitted on a continuous basis to the server system 305. Other techniques that may be used to reduce the amount of information transmitted between the mobile computing device 300 and the server system 305 may include transmitting the color images in black and white, transmitting in gray scale, transmitting reduced dots per inch (DPI) images, etc.

The trigger-detection engine 315 may include a compress-decompress (codec) module. For some embodiments, the codec may compress the captured video stream into a DivX format. DivX is a video compression technology developed by DivX, LLC of San Diego, Calif. The DivX format may enable users to quickly play and create high-quality video streams. DivX codec is a popular Moving Picture Experts Group-4 (MPEG-4) based codec because of its quality, speed, and efficiency. As a DivX codec, the codec may enable the captured video streams and/or the identified features or characteristics information of the objects/potential trigger item to be quickly transmitted to a server system 305 where the communication bandwidth may be limited (e.g., wireless communication). Other techniques that enable fast transmission of information from the mobile computing device to a server system 305 may also be used. For example, instead of transmitting an image or a captured video stream in its original color, a conversion may be performed to convert the image or the captured video stream from color to black and white to reduce the size of the information to be transferred.

Accordingly, the trigger-detection engine 315 monitoring the video stream from a video camera of the mobile computing device detects the real world trigger item by comparing objects in the video stream to known candidate trigger items stored in 1) a database communicatively connected to the mobile computing device over a network, 2) a local cache in the mobile computing device and 3) any combination of the two. The associated augmented reality content and actions are pulled from 1) a database communicatively connected to the mobile computing device over a network, 2) a local cache in the mobile computing device and 3) any combination of the two. The augmentation engine then overlays the augmented reality content onto the video stream being displayed on a display screen of the mobile computing device.

The augmentation engine 316 provides the augmented reality content to be overlaid onto the frames of the video stream in the mobile device 300 similar to augmentation engine 375 in the server system 305. The augmented reality information is to be overlaid as well as sized, scaled, and positioned relative to the trigger item. The overlaying includes initially merely putting a highlight on the trigger item so that the user can then activate the highlighted item to view and/or hear the augmented reality information overlaid with the captured video stream. The augmentation engine 316, like augmentation engine 375, can be coupled with the augment information database 360, of which database a portion is stored in the local cache 315 in the mobile device 300. The augmentation engine 316 is also configured to allow a user to create augmented reality content from stock locations including any combination of 1) off of the local memory of the smart mobile computing device 300, 2) from Internet sources, 3) from an augment information database 360 maintained at the backend server, 4) from a links database 350, or 5) similar source. The augmentation engine 316 then also allows the user to associate that augmented reality content with at least one trigger item from the trigger item engine 314/330.

The local cache 317 provides a dedicated local storage area on the mobile computing device 300 that is used to replicate portions of the various databases 342, 350, 360 maintained at the backend server system. Such information includes known trigger item information and augmented reality content information, and the cache storage space is for sole use by the augmented reality application 340 in the mobile computing device 300. Thus, the local cache 317 can be coupled with the trigger item engine 314 and configured to store augmented reality content and information associated with the known candidate trigger items.

Server system 305 may include a communication module to allow it to be connected to a network such as the network 200 illustrated in FIG. 2. The server system 305 may also include server applications that allow it to communicate with one or more mobile computing devices including, for example, the smart mobile computing device 300. Communication sessions may be established between the server system 305 and each instance of the downloaded augmented reality application resident in its own mobile computing device 300 to enable the receipt of the augmented reality related information 306 from the mobile computing device 300, and to conduct the transmission of the augmented reality information 390 to the mobile computing device 300. For some embodiments, the server system 305 may be coupled with object database 342, augmented content links database 350, and augment information database 360. Backend server system 305 may include two or more servers cooperating and distributing the work amongst that set of servers at that site to achieve that backend server's function in a faster manner. The mirroring of sites with identical compositions of hardware and content is done to help to improve the identification and augmentation response time. Also, in addition mirroring of identical server site locations aids in servicing potentially millions of mobile computing devices with the video application resident all submitting packets with distinguishing features for the trigger items and augmented reality content by distributing the workload and limiting the physical transmission distance and associated time.

For some embodiments, the server system 305 may include an object recognition engine 320, a trigger item engine 330, a detect trigger item engine 370, an object database 342, a links database 350, an augmented reality information database 360, and an augmentation engine 375.

As discussed earlier, the trigger-detection engine 315 of the augmented reality application on the client mobile computing device may use an extraction algorithm to identify the feature points of the potential trigger item in that frame, extracts those feature points along with data such as geographical information, compass direction, and other relevant information, and attempts to identify or match those feature points with those of a known trigger item. Most of the time, the augmented reality application will be able to identify trigger items and pair augmented reality content to those trigger items all by itself. When the object is unknown to the downloadable application, then it may transmit that packet of information about that object up to the backend server. The backend server system has the expansive knowledge databases 342, 350, 360 and distributed computing power in the object recognition engine 320 and the detect trigger item engine 370 to identify the characteristics of any points of interest for target object/target image and index them to make a known trigger item. The backend server system can analyze the series of frames coming in the video stream, and use this information to match the transmitted feature points of the potential trigger item to known objects or images in the database 340 in a similar manner as discussed for the trigger-detection engine 315.

A few additional points include that the object recognition engine 320 in the server is configured to take advantage of distributed workload computing across multiple servers to increase the speed of filtering out candidate known images stored in the object database 342 compared to the characteristics information transmitted by the mobile computing device. The servers take advantage of distributed computing among the set of servers, as well as the benefits of an intelligence engine that contextually making a nexus between various concepts, and mirroring of hardware and content to achieve near real time identifying trigger items captured in a video stream with augmented content. (See FIGS. 4 and 9 for a more detailed discussion on mirroring.) The video stream is captured by the mobile computing device, and the patterns are transmitted by the mobile computing device using wireless communication. The visually distinctive features included in the frames are then initially compared with visually distinctive features of known target items included in an object database to identify a known trigger item. The comparison may be performed by the object recognition engine 320 applying a hierarchical set of filters spread linearly across a set of two or more server computers connected to the network. Each object recognition engine 320 may work on filtering through different distinctive feature points of the potential trigger item, with each object recognition engine 320 starting with a different distinctive feature. The object recognition engine 320 may also use the geographical information included in the frames of the captured video stream 308 and the information stored in the object database 342 to recognize the target or real world objects. For example, a yellow building with the pyramid shape located at latitude coordinate X and longitude coordinate Y may be recognized as the National Financial Building. The object recognition engine 320 may apply a set of filters to the Meta data, characteristics, and visual information received from the mobile computing device 300 to determine whether it can recognize what the target object or who the person is. Since the captured video stream 308 may be comprised of a series of closely related frames both in time and in approximate location (e.g., based on GPS information), the frames generally include the same objects and/or persons and the characteristics/visual information. The frames then present multiple views of the same pattern of identified major feature points of the object (or the potential trigger item). This may also help the object recognition engine 320 to narrow down the matching options that are available in the object database 342 by getting a more complete understanding of the potential trigger item. For example, the object recognition engine 320 may recognize the distinctive feature points and the points of interest for a restaurant such as McDonalds because the series of frames make it clear that a yellow M appears in front of the building.

Next, the augmentation engine 375 can start transmitting to the mobile computing device 300 the potential large augmented reality content files such as video files, and advertisements while the object recognition engine 320 determines what the object is. Thus, at approximately at the same time as the object recognition engine 320 is hierarchically filtering or narrowing down the possible known matching images/object to the transmitted features, the augmentation engine 375 can be preparing and selecting augmented reality content to be transmitted back to the video processing module on the mobile computing device 300 for display. Note, similarly, the augmentation engine 316 can be preparing and selecting augmented reality content to be overlaid onto the video frames while the trigger item identification is performing its operations. Note, the local cache 317 may assist in improving the performance in that it may maintain a large portion of the augmented reality content most relevant to this user on the mobile device, thus eliminating the need to transmit augmented reality content. As discussed, the local cache 317 may maintain a large portion of the known candidate trigger items most relevant to this user on the mobile device, thus eliminating the need to transmit potential trigger items to the backend server for detection. Nonetheless, the augmentation engine 375 on the server can start transmitting the video files, and advertisements and images, textual messages, links to relevant web pages, etc. to supplement the content stored in the local cache 315. The back end server system may also periodically deliver any user-generated augmented reality scenarios stored in the back end server system to each augmented reality application resident on its own mobile computing device, such as smart mobile device 300 based on a channel subscription basis as will be discussed in more detail later.

The augmentation engine 316 may then overlay the augmented reality information onto the frames of the video stream. The video processing module then plays the video file with the augmented reality content on the display. The user can choose to activate the highlighted trigger item to view the augmented reality information associated with the frames of the video file being displayed on the display screen 106 of the mobile computing device 300.

The augmentation engine 375 cooperates with the augment information database 360 that stores the augmented reality content (e.g., video files, advertisements, links, etc.) to overlay onto objects in the frames. The augmentation engine 375 may be configured to receive the results from either the object recognition engine 320 or the trigger-detection engine 370 to determine how to select the proper augmented reality information to be transmitted to the mobile computing device 300 to augment the identified object in the original video file, and select that augmented reality information 380 from the augment information database 360. The augmented reality information 380 may be related to the objects or persons that have been recognized by the object recognition engine 320. Sometimes the augmented reality content being transmitted the pairing between trigger item and augmented reality content may be variable for the augmented reality scenario. Accordingly, the augmented reality information 380 may include in-depth information or content about the objects and/or persons included in the frames of the captured video stream 308. For example, the augmented reality information 380 may include listing of food establishments in various buildings, links to user reviews for a particular business, links to web pages, etc. The augmentation engine 375 may select the augmented reality information that is most relevant to the user. For example, the object may be an office building with many different businesses, and the object database 330 may include augmented reality information associated with each of the businesses. However, only the augmented reality information associated with an art gallery may be selected because the profile of the user or the operator of the mobile computing device 300 may indicate that the user is only interested in modern arts.

Next, the object database 342 may be configured to store information about a group of known objects. The information may describe the different characteristics including visual, audio, textual, and metadata of the known objects. This may include geographical information, color information, pattern information, and so on. In general, the characteristics of the object may include any information about the object that may be useful to identify the object and recognize it as a known object. For example, an office building located on the corner of Fourth Street and Broadway Avenue in downtown San Francisco, Calif., may be identified based on its unique pyramid shape architecture and orange color. Many techniques may be used to generate the information about the objects. For example, the information may be generated by human, or it may be generated by a special computer application coded to scan a color image and generate a list of objects included in the image along with their characteristics.

For some embodiments, the augment information database 360 stores a master composite of the augmented reality content and any other information from all of the different source depositories that may be inserted into the captured video stream 308. The information may include identification information (e.g., the university), advertisement information (e.g., restaurant discount coupons), link information (e.g., a URL link to the website of a restaurant), facial information (e.g., Bob Smith), etc. Different types of augmented reality information may be stored for the same object. The augmented reality content along with advertisements may be transmitted to the mobile computing device.

The selected augmented reality scenarios that have been transmitted to the mobile computing device 300 and potentially stored in the local cache 317 are used by the augmentation engine 316 to generate the augmented video stream 390. The augmented video stream 390 may then be viewed by the user or used by any other applications that may exist on the mobile computing device 300. It is within the scope of the embodiments of the disclosure that the operations of capturing the video stream, processing the captured video stream, recognizing object and/or persons in the captured video stream, augmenting the captured video stream, and presenting the augmented video stream to the user or the other applications occur in real time. For example, the user may capture a video stream 308 and almost instantaneously see the augmented video stream 390 displayed on the display screen 106 of the mobile computing device 300.

For some embodiments, the server 300 may be implemented as an Intelligent Data Operating Layer (IDOL) server using the IDOL software product and associated system of Autonomy Corporation of San Francisco, Calif. See FIG. 7.

Referring back to FIG. 1, the communication module 110 may be used to allow the mobile computing device 100 to be connected to a network such as, for example, the network 200 (see FIG. 2). The communication module 110 may be configured to enable the mobile computing device 100 to connect to the network 200 using wireless communication protocol or any other suitable communication protocols. For example, the communication module 110 may include a wireless fidelity (Wi-Fi®) module 111, a Bluetooth™ module 112, a broadband module 113, a short message service (SMS) module 114, and so on. As will be described, the communication module 110 may be configured to transmit visual information associated with a video stream from the mobile computing device 100 to one or more servers connected to the network 200.

The GPS module 115 may be used to enable the user to get directions from one location to another location. The GPS module 115 may also be used to enable generating the geographical information and associating the geographical information with images and frames of video streams. This process is typically referred to as geotagging. When the mobile computing device 100 is used to capture a video stream, the geographical information may be inserted into one or more the frames of the video stream. The geographical information may be inserted and stored with images, video streams, and text messages generated by the mobile computing device 100. The geographical information may be stored as metadata, and may include latitude and longitude coordinates. For example, the server system for the tagging and augmentation of geographically-specific locations can use a location of a building in an image by using the latitude and longitude coordinates associated or stored with that image and other distinctive features of the building to determine what objects are appearing in a video stream.

The video capturing module 120 may be configured to capture images or video streams. The video capturing module 120 may be associated with a video camera 121 and may enable a user to capture the images and/or the video streams. The video capturing module 120 may be associated with a direction sensor 122 to sense the direction that the video camera 121 is pointing to.

The display module 104 may be configured to display the images and/or the video streams captured by the video capturing module 120. For some embodiments, the display module 104 may be configured to display the images and/or the video streams that have been augmented with the augmented reality information. The display module 104 may be associated with a display screen 106.

The memory 130 may include internal memory and expansion memory. For example, the internal memory may include read-only memory (ROM) and random access memory (RAM), and the expansion memory may include flash memory. The memory 130 may be used to store an operating system (OS) and various other applications including, for example, productivity applications, entertainment applications, communication applications, image and/or video processing applications, user interface applications, etc. The processor 125 may be configured to execute instructions associated with the OS, network browsers, and the various applications. Some examples of the OS may include Android™ from Google, iOS from Apple, Windows® Phone from Microsoft, and WebOS® from Palm/HP, and so on. The network browsers may be used by the mobile computing device 100 to allow the user to access websites using the network 200.

The mobile computing device 100 may include an identity module 150 configured to provide the mobile computing device 100 a unique identity in a network. The identity module 150 may be a subscriber identity module (SIM). Although not shown in FIG. 1, the mobile computing device 100 may include a power source (e.g., a battery), a keyboard (although soft keyboard may be implemented), input/output interfaces (e.g., video, audio ports), external power connector, external memory connectors, an antenna, a speaker, etc.

Referring back to FIG. 2, the network environment illustrated in this example may be referred to as the client-server environment. The client-server relationship allows the operations of the mobile computing device 205A-205C to be triggered anywhere in the world and to augment any captured video stream with useful information enhancing the user's view of the real world. It should be noted that the number of mobile computing devices, servers, and databases illustrated in this example is for illustration purpose only and is not meant to be restrictive. It is within the scope of embodiments of the present disclosure that there may be many servers and databases worldwide to serve many more mobile computing devices.

The mobile computing devices 200A-200D may include features similar to the mobile computing device 100 described in FIG. 1. The servers 205A-205C may include communication modules and associated applications that allow them to be connected to the network 200 and to exchange information with the mobile computing devices 200A-200D. For example, a user using the mobile computing device 200A may interact with web pages that contain embedded applications, and then supply input to the query/fields and/or service presented by a user interface associated with the applications. The web pages may be served by the server 205A on the Hyper Text Markup Language (HTML) or wireless access protocol (WAP) enabled mobile computing device 205A or any equivalent thereof. The mobile computing device 205A may include browser software (e.g., Internet Explorer, Firefox) to access the web pages served by the server 205A.

Figure 3B:
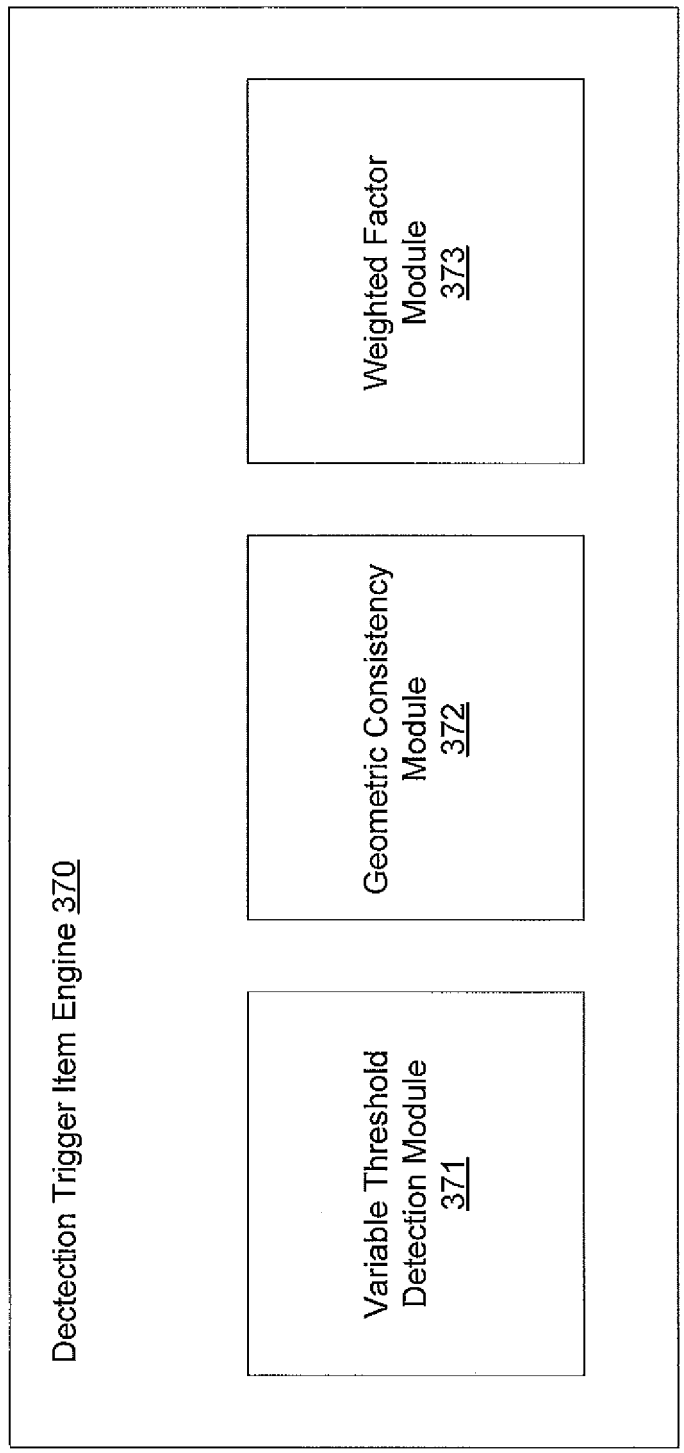
FIG. 3B illustrates a block diagram of an embodiment of an example detect trigger item engine that may apply a variable threshold to detect real world trigger items, in accordance with some embodiments.

FIG. 3B illustrates a block diagram of an embodiment of an example detect trigger item engine that may apply a variable threshold to detect real world trigger items, in accordance with some embodiments. The detect trigger item engine 370 may be configured to include a variable threshold detection module 371, a geometric consistency module 372, and a weighted factor module 373. Note, detect trigger item engine 315 from FIG. 3A can also have these same modules. As discussed above, the augmented reality application 340 does not need wireless connectivity with the management server system to understand and identify trigger items; rather, the trigger item engine 315 and trigger item engine 314 and local cache 317 can cooperate to perform these operations. However, the engines on the server can always supplement or support the engines in the augmented reality application.

Each real word trigger item and each candidate trigger item may possess many feature points as discussed above. For example, the number of feature points associated with a real world trigger item may be in the hundreds to the thousands. As a result, each real world trigger item may need to be evaluated differently rather than based on some fixed parameters. For example, identifying a first real world trigger item associated with few number of feature points (e.g., 120) based on a fixed parameter (e.g., 100) may be more accurate than identifying a second real world trigger item associated with many more number of feature points (e.g., 2000). In terms of percentage, the matching percentage for the first real world trigger item is about 83% whereas the matching percentage for the second real world trigger item is much less at about only 5%.

Nonetheless, the augmented reality application can easily recognize thousands of real world images (potentially a database of millions of candidate trigger items) and a virtually unlimited number of real world locations to use as trigger items for an augmented reality scenario. Each image of a real world trigger item will have some number of distinctive features, called feature points. The real world trigger item may also have very distinctive Meta data included in its feature points. However, some real world objects will have 10,000 feature points while others such as an image of a cloudless sky may have 100 feature points. Use of a fixed number of feature points as a threshold to confidently assert detection of the real world trigger item causes many problems. Use of a variable number for the threshold amount that also included intelligent analysis incorporating statistics and factoring out errant matches for candidate trigger items results in a superior user satisfaction of the augmented reality application on the mobile computing device. The detection algorithm breaks each real world object into patches/individual tiles and looks at each patch to determine how many/what amount of feature points match the template/base real world image. Once a threshold amount of matches occur, then the algorithm may confidently assert the trigger item has been found. However, because some real world trigger items have a large amount of distinctive feature points while other have relatively few distinctive feature points, then a threshold amount based on percentages is better than a fixed amount threshold amount. The threshold amount should be a percentage of the total amount of matching distinctive feature points rather than some fixed number. Further, the algorithm needs to have a weighted factor incorporating how often an errant match occurs for that particle image of the trigger item as well as incorporating a statistics in the analysis. Taking at least these two factors into account for the variable threshold amount allows confident identification of the real world trigger item, which results in greater user satisfaction while still being quick enough to be calculated in real time.

For some embodiments, the variable threshold detection module 371 may be configured to compare a number of feature points of the real world trigger items that match with the indexed feature points of known candidate trigger items to determine if a number of matches may meet or exceed a variable threshold. For example, the variable threshold may be set to 75% of the total number of feature points associated with a candidate trigger item rather than some fixed number of points. This probabilistic approach may provide a more scalable and robust solution to accurately identifying a real world trigger item.

As discussed, the variable trigger item algorithm also factors in many other intelligence factors to determine a proper candidate trigger item to match a detected real world trigger item. Factors such as overall geometric consistency, applying weighted factors using a statistical probabilistic model, performing of the n-gramic application on the feature points to include or exclude potential candidate trigger items, and other similar methods can all be factored in to improve the quality of detection of trigger items. This allows a better user experience and a far greater amount of known candidate trigger items to be present in the databases.

The geometric consistency module 372 may be configured to evaluate the geometric characteristics of the matching feature points to determine if they are consistent with those of the known feature points. For example, the geometric characteristics may include shape, size, dimension, appearance, etc. The trigger item engine determines whether an overall geometric shape of a composite of individual tiles making up the evaluated real world trigger item look similar enough to an overall geometric shape associated with the indexed feature points of the known candidate trigger items. When the shape, size, and/or dimensions of the real world trigger item are way off compared to a candidate's shape, size, and/or dimensions, then that candidate trigger item can be eliminated. The operations of the geometric consistency module 372 may further enhance the accuracy of the identification of the real world trigger item.

The weighted factor module 373 may be configured to apply weighted factors to further enhance the accuracy of identifying the real world trigger item. For one embodiment, the weighted factor module 373 may apply an n-gramic application to the matching feature points. The n-gramic application may involve using a set of feature points identified from the real world trigger item, which are used to positively include or exclude candidate trigger items based on whether the candidate trigger items contain that required set of feature points. The items to be included or excluded may be distinctive items that are associated with a known trigger item. For example, to correctly identify a real world trigger item as a known trigger item, the real world trigger item must have feature points corresponding to items A and B of the set and must not have feature points corresponding to item C of the set. Almost any kind of mathematical set and operators may be used in the required set.

Another weighted factor includes use of a statistical probabilistic model to evaluate an amount and kind of indexed feature points of known candidate trigger items compared to the identified feature points of the one real world trigger item to eliminate errant matches. If statistically, the identified feature points of the real world trigger item include 60 yellow squares, 40 yellow circles and has 4 distinct black letters, then statistically candidate trigger items that are more close to those same numeric amounts are stronger candidates then those further away from those amounts. For example, a first candidate trigger item that consists of individual tiles having 1325 yellow squares, 50 yellow circles and has 25 distinct black letters would not be as statistically relevant as second candidate trigger item that consists of individual tiles having 45 yellow squares, 30 yellow circles and has 3 distinct black letters. The second candidate trigger item is closer a statistical bell curve to the ideal than the first candidate trigger item even though the gross count of matching features in the second candidate trigger item exceeds the numeric amount being looked for in each category.

By having the variable threshold detection module 371, the geometric consistency module 372, and the weighted factor module 373, it may be possible to enable faster detection and identifying real world trigger items. It may also be possible to have a much larger database of known candidate trigger items for detection.

Another Example Network Diagram

Figure 4:
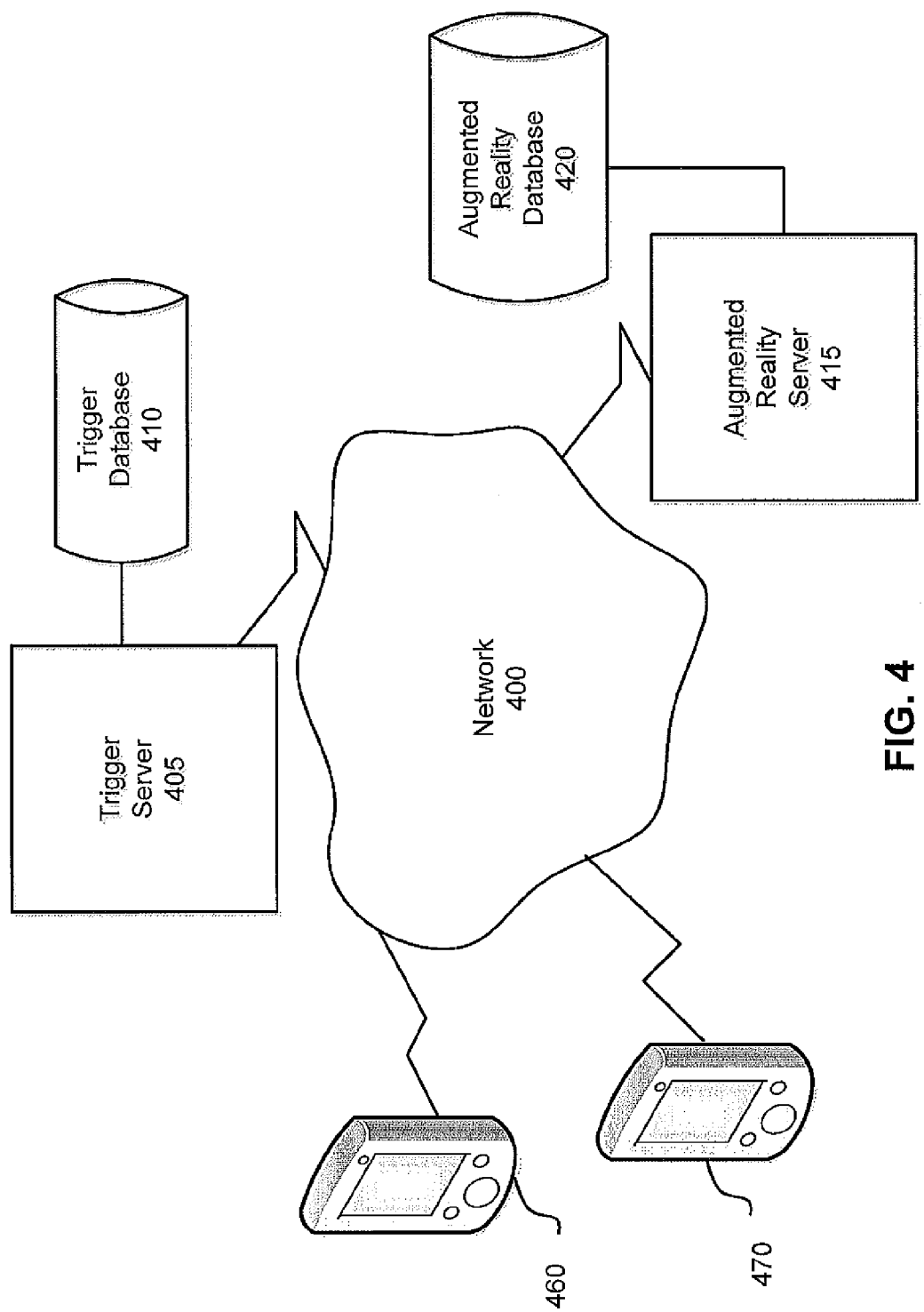
FIG. 4 illustrates a block diagram of an embodiment of another example network diagram with mirrored servers that may be used to divide up and filter information received from the mobile computing devices to make the system respond to a plurality of instances of downloaded applications in real time, in accordance with some embodiments.

FIG. 4 illustrates a block diagram of an embodiment of another example network diagram with mirrored servers that may be used to divide up and filter information received from the mobile computing devices to make the system respond to a plurality of instances of downloaded applications in real time. As illustrated in the example embodiment, network 400 may be connected to a trigger server 405 that is in communication with a trigger database. Various embodiments of the systems and methods described herein are capable of recognizing trigger items such as images, symbols, and objects in the real world and understanding them. These trigger items can be stored in the trigger database 410 for retrieval by the trigger server 405 such that they are available over the network 400.

The network 400 is also connected to an augmented reality server 415 that is connected to an augmented reality database 420. The systems and methods described herein bring the physical and virtual worlds together. When the trigger server 505 recognizes a trigger items such as images, symbols and representations of objects in the real world stored in the trigger database 410 the trigger item can cause the augmented reality server 415 to then deliver relevant content including augmented reality overlays stored in the augmented reality database 420. As discussed, the augmented reality content may be superimposed on a view of the real world. For example, a user may view the real world, in real time, by looking at a video screen on a mobile handheld device 400A, 400B. Using a camera in the device the area around the user might be filmed and the images can be displayed on the screen of the mobile device 400A, 400B. The augmented reality overlays can then be superimposed on the view of the real world on the screen of the mobile device 400A, 400B. Note, the display screen of the device extends to glasses and visors on the head or face of the user, where the glasses and visors are connected to the mobile device 400A.

Block Flow Diagrams

Figure 5:
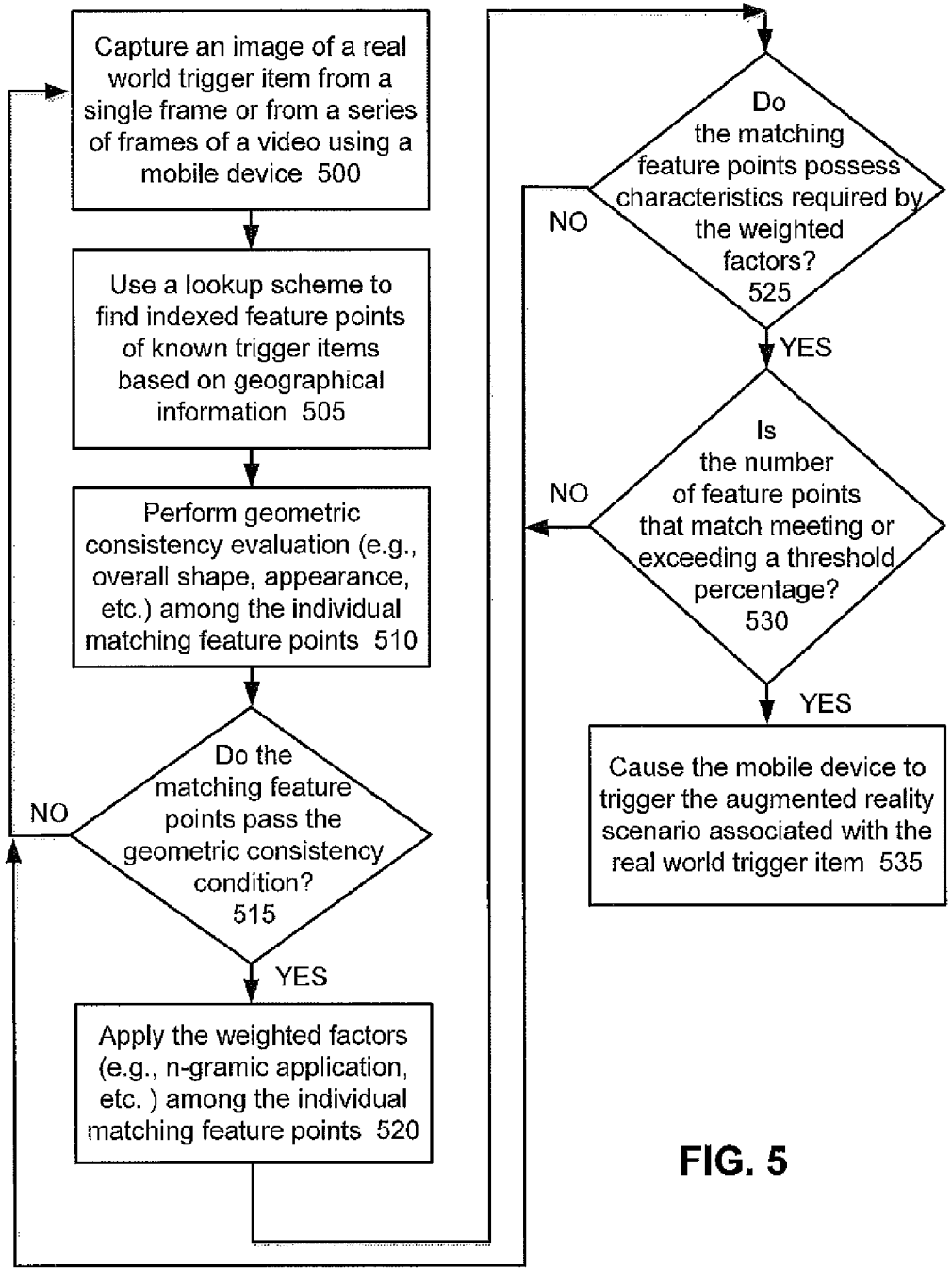
FIG. 5 illustrates an example flow diagram of a process that may be used to detect a real world trigger item based on a variable threshold to cause activation of augmented reality scenarios.

FIG. 5 illustrates an example flow diagram of a process that may be used to detect a real world trigger item based on a variable threshold to cause activation of augmented reality scenarios. The steps that follow may be performed out of order where logically possible and performance of all the steps in not mandatory. The process may be performed automatically by the detect trigger item engine 315 or 370, shown in FIGS. 3A and 3B. The augmented reality application by using any combination of a variable threshold operation, a geometric consistency operation, and a weighted factor operation may detect and identify real world trigger items more accurately and confidently, which may allow a much larger database of known candidate trigger items.

In step 500, an image of a real world object may be captured by a video module of the mobile computing device. The image may be part of a video file, and the real world object may be included in a frame or a series of frames of the video. In step 505, a look up scheme may be used to search a database of indexed feature points of known candidate trigger items. The operations of step 505 may include Meta data associated with the image such as geographical information (e.g., GPS information) associated with a location where the video is captured. Once the matching feature points are identified, first a simple matching of how many identified feature points of the real world trigger item match up to those stored and indexed for the candidate trigger items. In addition, a geometric evaluation of the individual matching feature points may be performed, as shown in step 510. The operations in step 515 may include comparing an overall composite of the individual tiles of the real world image to the shape, appearance, size, etc. of the matching feature points of the known candidate trigger items. From the step 515, if the geometric consistency is lacking, the process may flow back to step 500 where the operations may continue with obtaining additional information/images of the real world trigger item or eliminate candidate trigger items that do not share the same overall geometric shape and size as the current real world trigger item. From the step 515, if there is geometric consistency, the process may flow to step 520 where weighted factors such as, for example, 1) n-gramic application of required sets, 2) using a statistical probabilistic model, and 3) other similar weighting factors, may be applied to the matching feature points. As mentioned above, the n-gramic application may use a required set of feature points. For example, some feature points must be included in the set for this to be a candidate trigger item, and in other case some other feature points must not be found in the set for this to be a candidate trigger item. This parallel process can assist to eliminate large numbers of candidate trigger items. Another weighted factor applied is a statistical probabilistic model to evaluate an amount and kind of indexed feature points of known candidate trigger items compared to the identified feature points of the one real world trigger item to eliminate errant matches. At step 525, a test may be performed to determine if the matching items satisfy the requirements associated with the weighted factors. If the requirements are not met, the process may flow back to step 500 where the operations may continue with obtaining additional information/images of the real world trigger item or eliminate candidate trigger items that the weighted factors help filter out. If the requirements are met, the process may flow to step 530. At step 530, a test may be performed to determine if the threshold percentage is met or exceeded. The threshold percentage is discussed above with FIG. 3B. A percentage of a number of the matching feature points relative to a total number of feature points of a known trigger item may be determined. In the example mentioned in FIG. 3B, the matching percentage is 83% and the variable threshold is 75%. When the threshold percentage is met or exceeded (e.g., 83% is higher than 75%), the process may flow to step 535 where the mobile device is trigger to present the augmented reality scenario associated with the real world trigger item. If not, the process may flow back to step 500.

Figure 6:
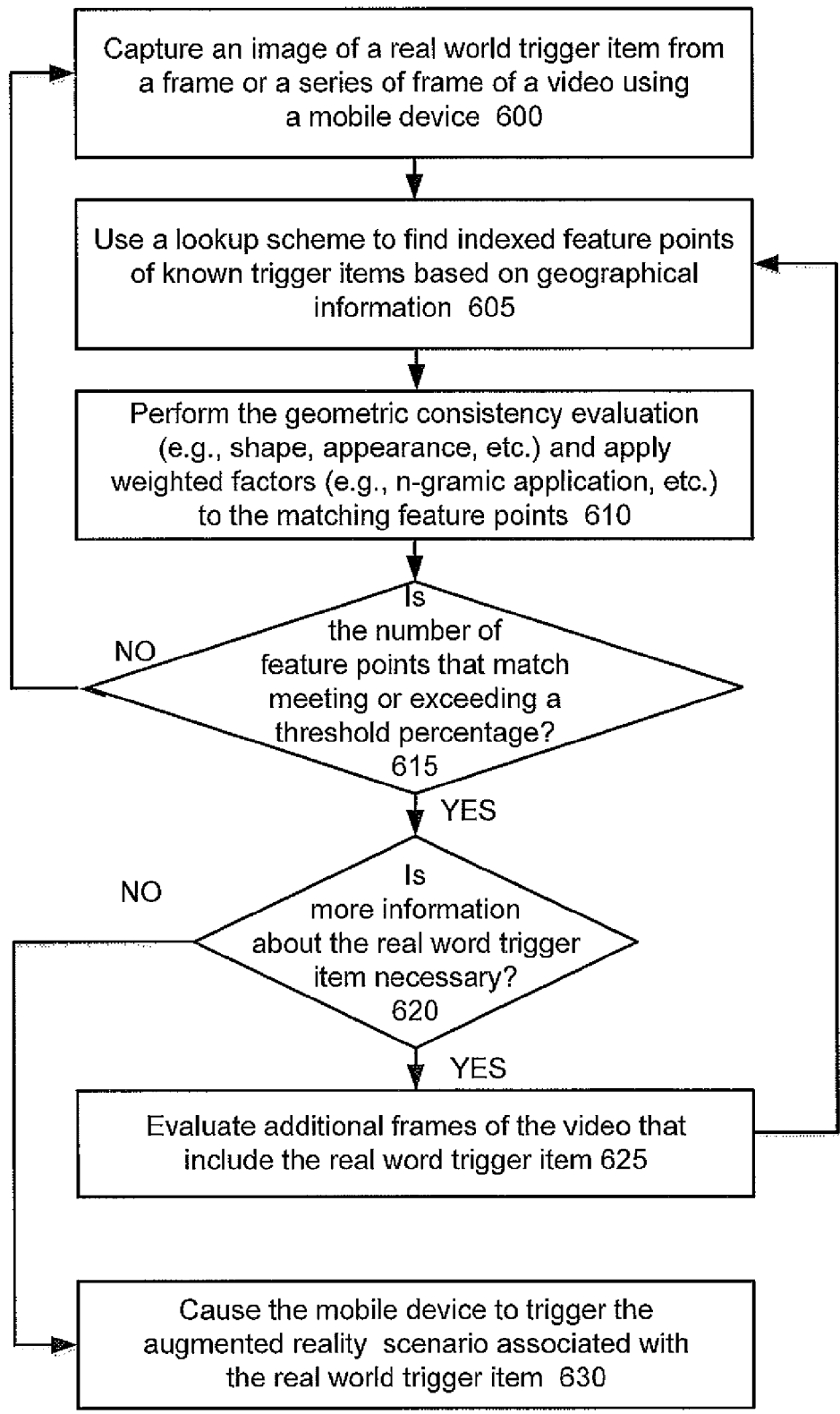
FIG. 6 illustrates an example flow diagram of a process that may be used to detect a real world trigger item based on a variable threshold and a confidence factor to cause activation of augmented reality scenarios, in accordance with some embodiments.

FIG. 6 illustrates an example flow diagram of a process that may be used to detect a real world trigger item based on a variable threshold and a confidence factor to cause activation of augmented reality scenarios, in accordance with some embodiments. The process may be performed automatically by the detect trigger item engine 370 and/or trigger item engine 315. The operations described in steps 600 to 630 may be similar to the operations described in the steps 500 to 530 of FIG. 5. In step 620, a test may be performed to determine whether the information just analyzed about the real world trigger item is sufficient to conclude that the real world trigger item matches with a known item. For some embodiment, a confidence factor may be used to determine whether this test needs to be performed. For example, the confidence factor may be low if the number of frames used to evaluate a real world trigger item may not be sufficient. If the result of the operations of the step 620 indicates that there is sufficient information, the process may flow to step 630 where the mobile device is trigger to present the augmented reality scenario associated with the real world trigger item on a display of the mobile device. This may include having the augmented reality scenario overlaying the information currently displayed on the display of the mobile device. If there is not sufficient information, the process may from step 620 to step 625 where more video frames may be analyzed. From step 625, the process may return to step 620.

The process described in FIGS. 5 and 6 may generally require the detect trigger item engine 370 to perform a one-to-many approach by positively matching the feature points of the one real world trigger item with the indexed feature points of the many known candidate trigger items. In these types of operations, the detect trigger item engine 370 evaluates the features points of a one captured image and tries to compare these features to the indexed features of the many known candidate trigger items. The engine 370 processes down the potential indexed paths of feature points to find a solution of whether a candidate trigger item has been found from the features points indexed for the many potential trigger items. For some embodiments, the detect trigger item engine 370 may be configured to apply a many-to-one approach by eliminating one or more of the many known candidate trigger items from being a match to the one real world trigger item based on distinctive characteristics of the known candidate trigger items. In the many-to-one operations, the detect trigger item engine 370 may evaluate distinctive feature points of known candidate trigger items to quickly isolate and eliminate a known trigger item as a recognized trigger item. For example, when an image of a local church is captured and evaluated, the detect trigger item engine 370 may quickly eliminate the Eiffel Tower as a matching known trigger item because of the unique distinctive feature of the Eiffel Tower. In some embodiments, the engine 370 may perform the one to many approach in parallel with the many to one approach to find a faster solution.

Sharing Augmented Reality Scenarios

In an embodiment, to use a shared augmented reality scenario, the user needs three things: a smart phone with the augmented reality application installed, an augmented reality application URL (e.g., from a friend), and an image to point at. Once the user has the phone, the application, and the URL, the user should make sure the augmented reality application is running, go to the smart phone's web browser or email, and click on the URL. The augmented reality application should tell the user that it is adding the augmented reality scenario to a local database. When it is ready, the user can point the phone at the picture, and it will come to life. If the user was not told what picture to point the smart phone at, then the user can point the camera around the location and the augmented reality application will automatically detect the trigger items in view.

Intelligent Data Operating Layer (IDOL) Server

Figure 7:
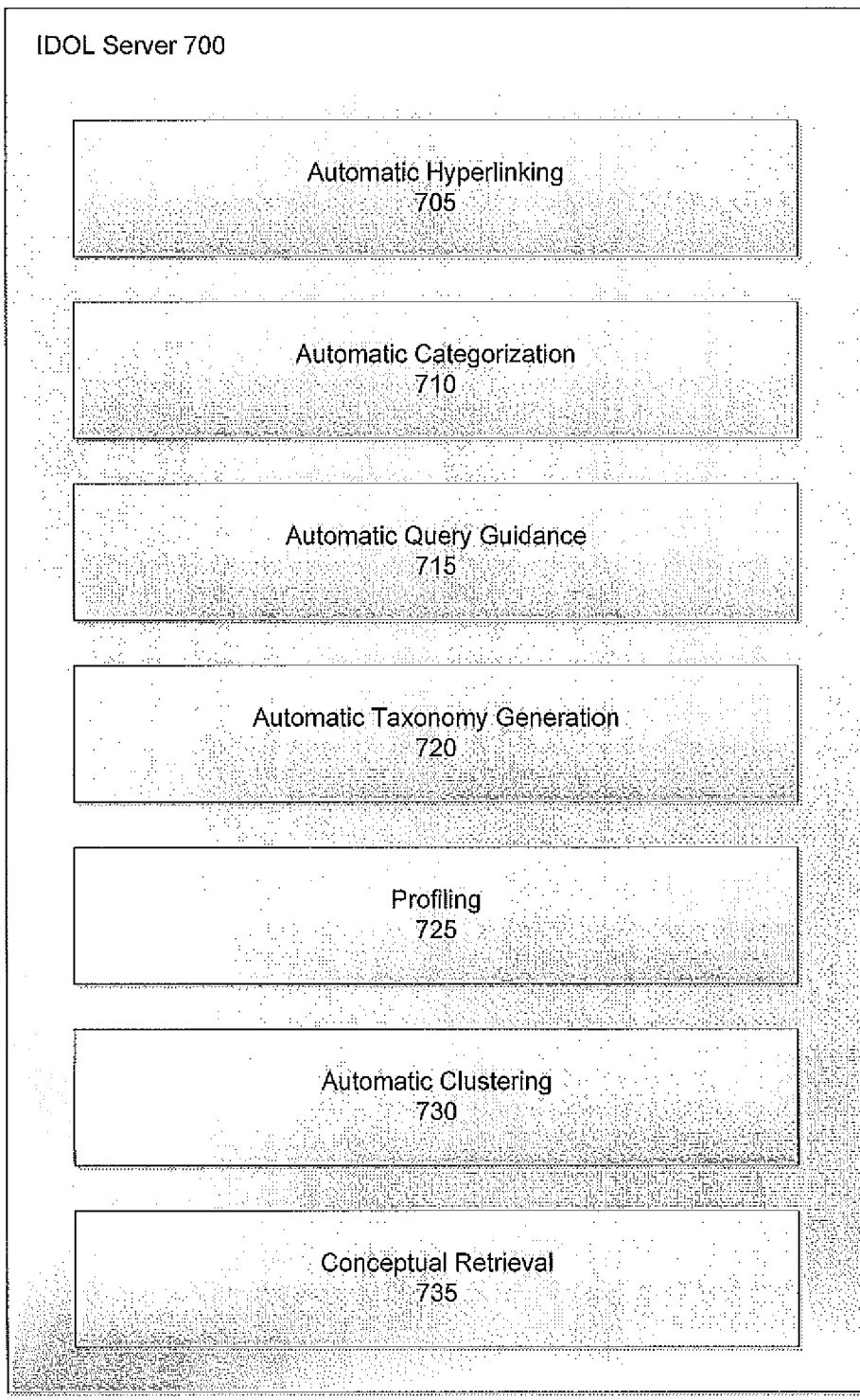
FIG. 7 illustrates an example block diagram of some modules of an IDOL server, in accordance with some embodiments.

FIG. 7 illustrates an example block diagram of some modules of an IDOL server, in accordance with some embodiments. IDOL server 705 may include automatic hyperlinking module 708, automatic categorization module 710, automatic query guidance module 715, automatic taxonomy generation module 720, profiling module 725, automatic clustering module 730, and conceptual retrieval module 735. The automatic hyperlinking module 708 is configured to allow manual and fully automatic linking between related pieces of information. The hyperlinks are generated in real-time at the moment the document is viewed. The automatic categorization module 710 is configured to allow deriving precise categories through concepts found within unstructured text, ensuring that all data is classified in the correct context.

The IDOL server collects indexed data from connectors from various sources to train the engines and stores it in its proprietary structure, optimized for fast processing and retrieval of data. As the information processing layer, IDOL forms a conceptual and contextual understanding of all content in an enterprise, automatically analyzing any piece of information from over thousands of different content formats and even people's interests. Hundreds of operations can be performed on digital content by IDOL, including hyperlinking, agents, summarization, taxonomy generation, clustering, deduction, profiling, alerting, and retrieval. The IDOL Server has the knowledge base and interrelates the feature pattern being transmitted by the video processing module 135. An example of the some of the modules included in the IDOL server is illustrated in FIG. 7. As discussed earlier, the IDOL server may be used as part of the backend server system.

The IDOL servers implement a conceptual technology is context-aware and uses deep audio and video indexing techniques to find the most relevant products, including music, games, and videos. The IDOL servers categorize content automatically to offer intuitive navigation without manual input. The IDOL servers also generate links to conceptually similar content without the user having to search.

The automatic query guidance module 715 is configured to provide query suggestions to find most relevant information. It identifies the different meanings of a term by dynamically clustering the results into their most relevant groupings. The automatic taxonomy generation module 720 is configured to automatically generate taxonomies and instantly organizes the data into a familiar child/parent taxonomical structure. It identifies names and creates each node based on an understanding of the concepts with the data set as a whole. The profiling module 725 is configured to accurately understand individual's interests based on their browsing, content consumption, and content contribution. It generates a multifaceted conceptual profile of each user based on both explicit and implicit profiles.

The automatic clustering module 730 is configured to help analyze large sets of documents and user profiles and automatically identify inherent themes or information clusters. It even cluster unstructured content exchanged in emails, telephone conversations and instant messages. The conceptual retrieval module 735 is configured to recognize patterns using a scalable technology that recognizes concepts and find information based on words that may not be located in the documents. It should be noted that the IDOL server 705 may also include other modules and features that enable it to work with the mobile computing device 100 to generate the augmented video stream as described herein. As described above, one or more of the modules of the IDOL server 705 may be used to implement the functionalities of the object recognition engine 305, the augmentation engine 375, etc.

Computer System

Figure 8:
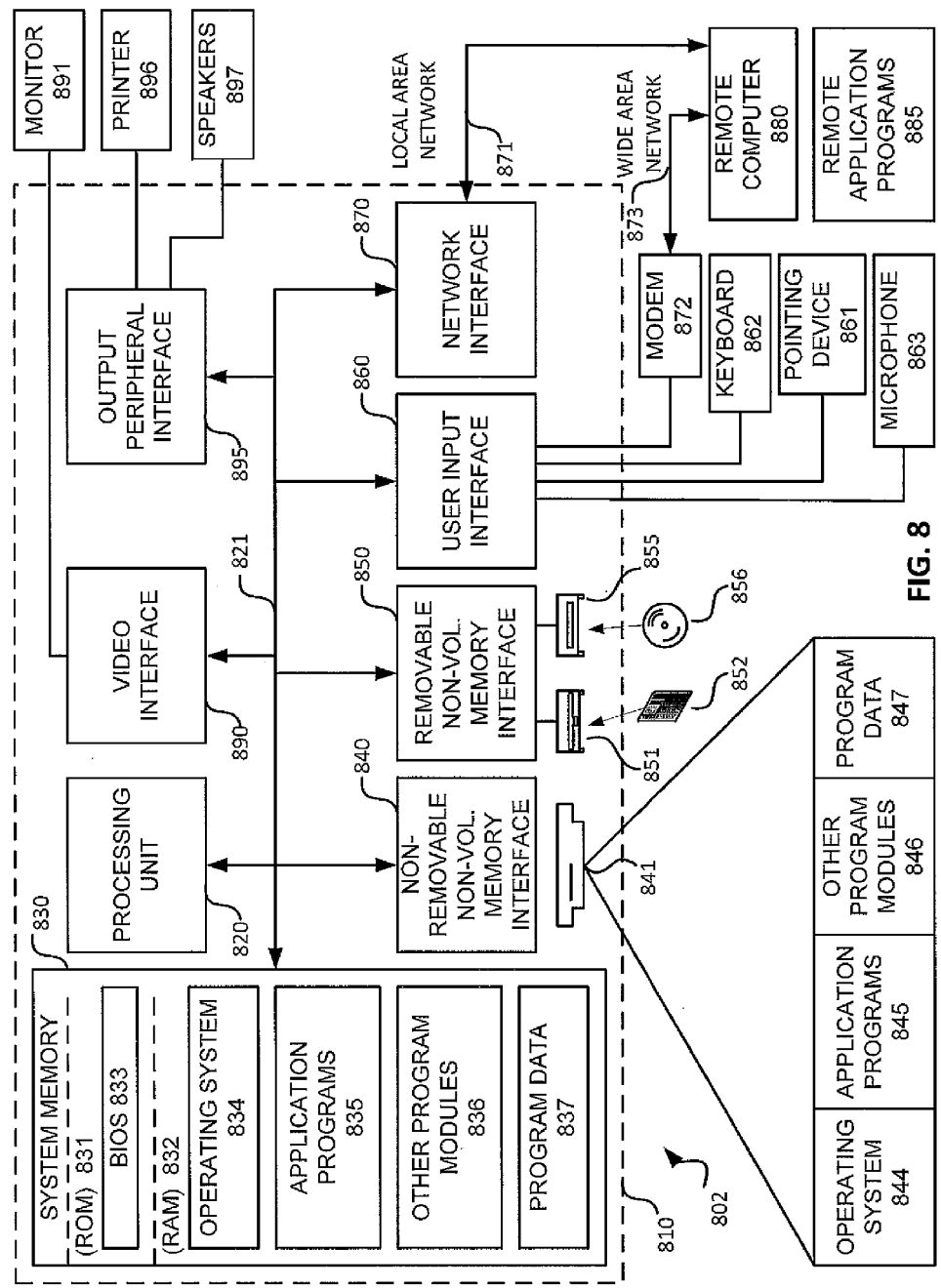
FIG. 8 illustrates another example computer system that may be used to implement an augmented video stream, in accordance with some embodiments.

FIG. 8 illustrates an example computer system that may be used to implement an augmented video stream, in accordance with some embodiments. Computing environment 802 is only one example of a suitable computing environment and is not intended to suggest any limitations as to the scope of use or functionality of the embodiments of the present disclosure. Neither should the computing environment 802 be interpreted as having any dependency or requirement relating to any one or combination of components illustrated in FIG. 8.

Embodiments of the disclosure may be operational with general purpose or special purpose computer systems or configurations. Examples of well-known mobile computer systems that may be used include, but are not limited to, hand-held or laptop devices, Tablets, Smart phones, Netbooks, smart phones, and the like.

Embodiments of the present disclosure may be described in the general context of computer-executable instructions, such as program modules, routines, or engines, being executed by a computer system. Generally, program modules include routines, programs, databases, objects, components, data structures, etc. that performs particular tasks or implement particular abstract data types. Those skilled in the art can implement the description and/or figures herein as computer-executable instructions, which can be embodied on any form of computer readable media discussed below.

Embodiments of the present disclosure may also be practiced in distributed computing environments where tasks are performed by remote processing devices that are linked through a communications network. In a distributed computing environment, program modules may be located in both local and remote computer storage media including memory storage devices.

Referring to FIG. 8, the computing environment 802 includes a general-purpose computer system 810. Components of the computer system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

Computer system 810 typically includes a variety of non-transitory computer readable media. Computer readable media can be any available media that can be accessed by computer system 810 and includes both volatile and nonvolatile media, removable and non-removable media. By way of example, and not limitation, computer readable mediums uses include storage of information such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer system 810. Communication media typically embodies computer readable instructions, data structures, program modules, or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer system 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

A participant may enter commands and information into the computer system 810 through input devices such as a keyboard 862, a microphone 863, and a pointing device 861, such as a mouse, trackball or touch pad. Other input devices (not shown) may include a joystick, game pad, scanner, or the like. These and other input devices are often connected to the processing unit 820 through a user input interface 860 that is coupled with the system bus 821, but may be connected by other interface and bus structures, such as a parallel port, game port or a universal serial bus (USB). A monitor 891 or other type of display device is also connected to the system bus 121 via an interface, such as a video interface 890. In addition to the monitor, computers may also include other peripheral output devices such as speakers 897 and printer 896, which may be connected through an output peripheral interface 890.

The computer system 810 may operate in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer system 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer system 810 is connected to the LAN 871 through a network interface or adapter 870. When used in a WAN networking environment, the computer system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, program modules depicted relative to the computer system 810, or portions thereof, may be stored in a remote memory storage device. By way of example, and not limitation, FIG. 8 illustrates remote application programs 885 as residing on remote computer 880. It will be appreciated that the network connections shown are exemplary and other means of establishing a communications link between the computers may be used.

Another device that may be coupled with the system bus 821 is a power supply such as a battery or a Direct Current (DC) power supply and Alternating Current (AC) adapter circuit. The DC power supply may be a battery, a fuel cell, or similar DC power source needs to be recharged on a periodic basis. The communication module (or modem) 872 may employ a Wireless Application Protocol (WAP) to establish a wireless communication channel. The communication module 872 may implement a wireless networking standard such as Institute of Electrical and Electronics Engineers (IEEE) 802.11 standard, IEEE std. 802.11-1999, published by IEEE in 1999.

Server Mirroring and Distributed Processing

Figure 9:
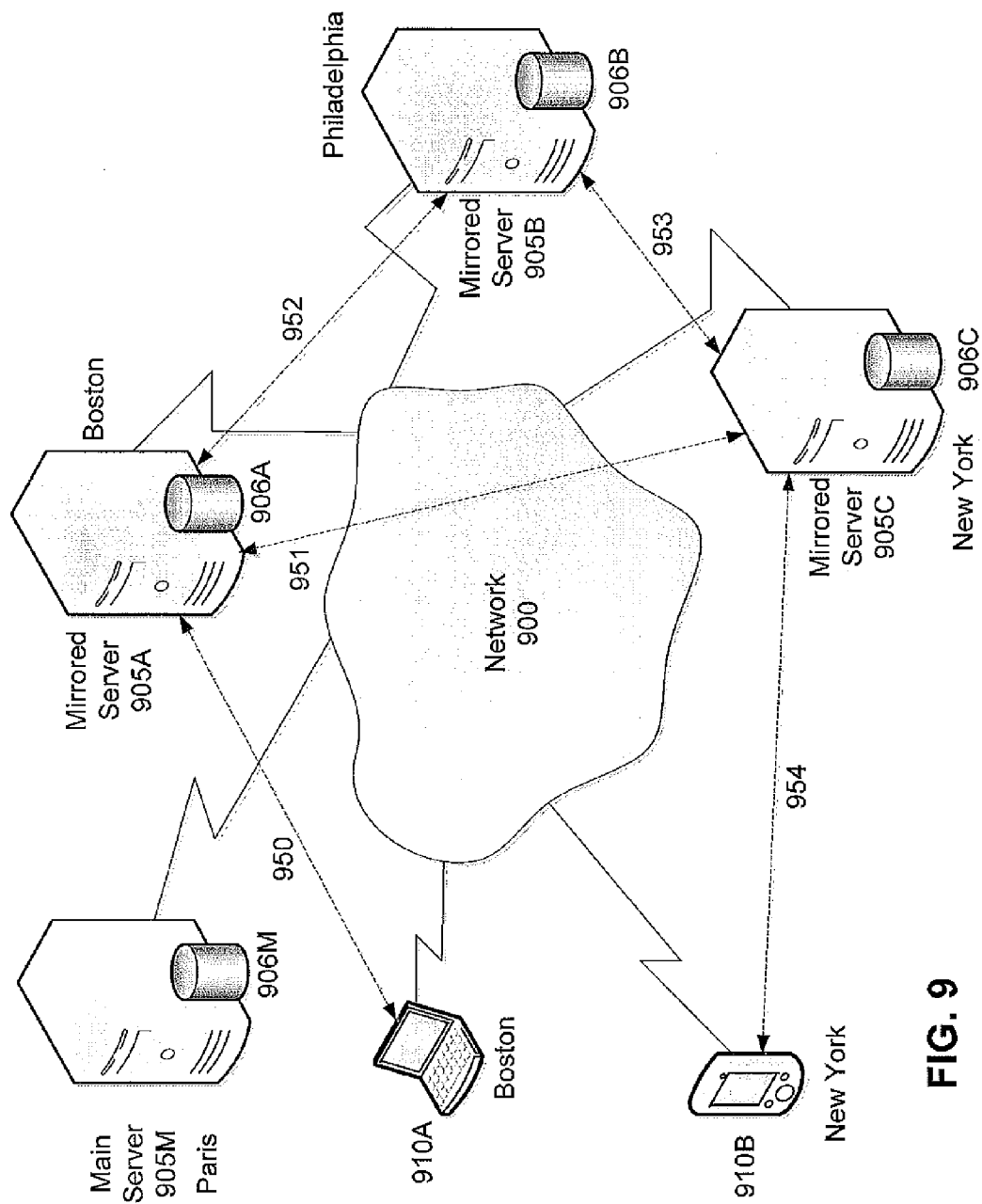
FIG. 9 illustrates an example of a network diagram with mirrored servers that may be used to filter information received from the mobile computing devices, in accordance with some embodiments.

FIG. 9 illustrates an example of a network diagram with mirrored server sites that may be used to filter information received from the mobile computing devices, in accordance with some embodiments. In this example, each server site is represented by one server for simplicity. However, it should be understood that each server site may include multiple servers working together collaboratively in a distributive manner as described above. Servers 905M, 905A, 905B, and 905C connected to the network 900 may be configured as IDOL servers. The IDOL servers may include a main IDOL server 905M and multiple mirrored IDOL servers 905A-905C. The main IDOL server 905M may mirror its information onto the mirrored IDOL servers 905A-905C. The mirroring may include mirroring the content of the main IDOL server database 906M into the mirrored IDOL sever databases 906A-906C. For example, the object database 300, the facial recognition database 342, and the augment information database 350 may be mirrored across all of the mirrored IDOL servers 905A-905C. The main IDOL server 905M and the mirrored IDOL servers 905A-905C may be located or distributed in various geographical locations to serve the mobile computing devices in these areas. For example, the main IDOL server 905M may be located in Paris, France, the mirrored IDOL server 905A may be located in Boston, Mass., 905B in Philadelphia, Pa., and 905C in New York, N.Y. As discussed, the mirroring of a server in one location with another server in another location may be understood as the mirroring of a server site with all of its servers together with associated hardware and content.

For some embodiments, a set two or more IDOL servers may work together in a cooperative and distributive manner to do the work of the object recognition engine described in FIG. 3A. For example, there may be a set of two or more IDOL servers in Boston configured to perform the operations of the object recognition engine. Similarly, a set of two or more IDOL servers may work together in the same cooperative and distributive manner to do the work of the, facial recognition engine or the augment engine. This allows the functionalities of the object recognition engine, the facial recognition engine, and the augment engine amongst the set of servers to be performed in a faster manner.

The distribution of servers within a given location or sister helps to improve the identification and augmentation response time. The IDOL server set being duplicated with the same content and mirrored across the Internet to distribute this load to multiple identical sites to increase both response time and handle the capacity of the queries by those mobile computing devices.

For some embodiments, the downloaded application may include a coded block to call up and establish a persistent secure communication channel with a nearest non-overloaded mirrored site of the main IDOL server when the mobile computing device 410A, 410B is used to capture a video stream. For example, the mobile computing device 900A may be connected with the IDOL server 905A via communication channel 950 because both are located in Boston. However, when the IDOL server 905A is overloaded, the mobile computing device 900A may be connected with the IDOL server 905C in New York because it may not be overloaded even though the IDOL server 905C may be further from the mobile computing device 900A than the IDOL server 905A.

For some embodiments, a set of IDOL servers may be used to filter the information received from the mobile computing devices. A hierarchical set of filters may be spread linearly across the set of IDOL servers. These IDOL servers may work together in collaboration to process the transmitted object and/or person visual information to determine or recognize what the object or who the person is. For example, when the mobile computing device 900A establishes the communication channel 950 with the IDOL server 905A, the IDOL servers 905A-905C may work together to process the information received from the mobile computing device 900A. This collaboration is illustrated by the communication channel 951 between the IDOL server 905A and 905C, and the communication channel 952 between the IDOL server 905A and 905B. Similarly, when the mobile computing device 900B establishes communication channel 954 with the IDOL server 905C, the IDOL servers 905C, 905B and 905A may work together to process the information received from the mobile computing device 900B. This collaboration is illustrated by the communication channel 951 between the IDOL server 905C and 905A, and the communication channel 953 between the IDOL server 905C and 905B.

Each server in the set of servers applies filters to eliminate the pattern of features received from the mobile computing device 410A, 410B as possible matches to feature sets of known objects in the object database. Entire categories of possible matching objects can be eliminated simultaneously, while subsets even within a single category of possible matching objects can be simultaneously solved for on different servers. Each server may hierarchically rule out potentially known images on each machine to narrow down the hierarchical branch and leaf path to a match or no match for the analyzed object of interest. In addition, the augmentation engine and facial recognition engine both may have their functionality distributed out amongst a set of two or more servers at the site.

The mobile computing device 410A, 410B has built-in Wi-Fi circuitry, and the video stream is transmitted to an IDOL server on the Internet. The IDOL server set contains an object recognition engine that can be distributed across the IDOL server set, IDOL databases, and an augment engine as well. The object recognition engine distributed across the IDOL server set applies a hierarchical set of filters to the transmitted identified points of interest and their associated major within each frame of a video stream to determine what that one or more potential trigger item are within that frame. Since this is a video feed of a series of closely related frames both in time and in approximate location, the pattern of identified major features of potential trigger item within each frame of a video stream helps to narrow down the matching known object stored in the object database.

The collaboration among the IDOL servers may help speed up the recognition process. For example, each of the IDOL servers may apply filters to eliminate certain pattern of features as possible matches to features of known objects stored in the object database. Entire categories of objects may be eliminated simultaneously, while subsets even within a single category of objects may be simultaneously identified as potential matching objects by the collaborating IDOL servers. Each IDOL server may hierarchically rule out potential known objects to narrow down the hierarchical branch and leaf path to determine whether there is a match.

For some embodiments, each of the IDOL servers may match the pattern of the visually distinctive features of the potential trigger item in the frame to the known objects in the object database. The geometric shape of the features of the point of interest X-Y coordinates may come across to a human like a dot-to-dot connection illustration. When the X-Y coordinates of the dots on the grid of the paper are connected in the proper sequence, recognizing the image/ object associated with those dots on the piece of paper is a simple task. This may include comparing the dot-to-dot type geometric shapes transmitted features along with their distinctive colors, recognized text, numbers and symbols, geographical information, direction information relative to the camera to the feature sets stored in the object database. The dot-to-dot type geometric shapes can be subset into distinctive triangles, pyramids, rectangles, cubes, circles and cylinders, etc., each with its own associated distinctive colors or patterns, to aid in the identification and recognition. Each of the IDOL servers, on a hierarchical basis, may map the collection of feature points about the potential trigger item to a stored pattern of feature points for known objects to match what is in the frames to the known object.

As discussed, the server has a set of one or more databases to store a scalable database of visual information on locations such as buildings, and structures, in order to perform subsequent matching of a visual data stream to determine the building or structure that is being viewed. The server-client system addresses the problem of determining the exact location of a mobile user, and to determine exactly what the user is looking at, at any point, by matching it against a database of characteristics associated with those visual images. The system gives the ability to construct a scalable solution to the problem to identify location, regardless of position and with minimal training.

The system with the server and a set of one or more databases (e.g., object database, facial recognition database, augment information database, user profile database) is trained on a set of views of the world and the models derived are stored for future retrieval. The combination of geographical information and visual characteristics allows a faster matching. Following this, the mobile computing device can be deployed to collect geospatial information and a video data stream from the camera and feed it back to the system. This is used to pinpoint the objects or locations within view and augment the video stream with additional visual or audiovisual objects or images.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, Java, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

The present disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled with a computer system bus. The augmented reality application as well as portions of the backend server system consist of electronic circuits, software instructions, electronic circuits cooperating with software instructions, and any combination of the three, where any portions of the augmented reality application and/or the backend server system that are implemented in software are stored on non-transitory computer readable medium, which stores instructions in an executable format by a processor.

The algorithms and displays presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description below.

In the following description of exemplary embodiments, reference is made to the accompanying drawings that form a part hereof, and in which it is shown by way of illustration specific embodiments in which the disclosure can be practiced. Also, it should be appreciated that one or more structural features described in one embodiment could be implemented in a different embodiment, even if not specifically mentioned as being a feature thereof.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims. For example, specific examples are provided for shapes and materials; however, embodiments include those variations obvious to a person skilled in the art, such as changing a shape or combining materials together. Further, while some specific embodiments of the disclosure have been shown the disclosure is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. A processor may be a central processing unit, a multiple core and multiple threaded processor, a digital signal processor, and other similar component configured to interpret and execute instructions. The disclosure is to be understood as not limited by the specific embodiments described herein, but only by scope of the appended claims.

What is claimed is:

1. A computer-implemented method comprising:
processing a stream of frames of a scene captured using a camera of a mobile computing device when operated by a user;
performing image recognition to recognize, from one or more frames of the stream of frames, a trigger item corresponding to any one of a symbol, person, or object depicted in the scene; and in response to performing image recognition, (i) determining an augmented reality scenario that includes an augmented reality content item generated by a second user of another computing device using an image of a symbol, person or object that is deemed to sufficiently match the trigger item based on a predetermined confidence factor, and (ii) presenting, on a display, the augmented reality scenario with the trigger item, as the trigger item is depicted in the stream of frames of the scene.

2. The computer-implemented method of claim 1, wherein performing image recognition includes performing the image recognition on a plurality of frames of the stream of frames.

3. The computer-implemented method of claim 2, wherein performing image recognition includes determining a plurality of feature points of the trigger item from multiple frames of the stream of frames.

4. The computer-implemented method of claim 1, further comprising transmitting at least a set of frames from the stream of frames from the mobile computing device of a user to a remote server system, the remote server system performing image processing operations for at least some of the image recognition on at least the set of frames to detect the trigger item by comparing the one or more characteristics of the trigger item with characteristics of known items in a database of the remote server system.

5. The computer-implemented method of claim 4, wherein determining the augmented reality scenario includes receiving, on the mobile computing device, the augmented reality content item for the augmented reality scenario from the remote server system.

6. The method of claim 5, wherein the remote server system cooperates with multiple instances of an augmented reality application that each reside on different computing devices, including an instance of the augmented reality application that resides on the mobile computing device.

7. The method of claim 1, wherein the trigger item corresponds to one or more of a billboard or a poster, and wherein the augmented reality content corresponds to a video.

8. A non-transitory computer-readable medium storing instructions that, when executed by a processor, cause the processor to:
process a stream of frames of a scene detected by a camera of a mobile computing device in real-time, the mobile computing device being operated by a user;
perform image recognition to recognize, from one or more frames of the stream of frames, a trigger item corresponding to any one of a symbol, person, or object depicted in the scene; and
in response to performing image recognition, (i) determine an augmented reality scenario that includes an augmented reality content item generated by a second user of another computing device using an image of a symbol, person or object that is deemed to sufficiently match the trigger item based on a predetermined confidence factor, and (ii) provide for display, the augmented reality scenario with the trigger item as the trigger item is depicted in the stream of frames of the scene.

9. The non-transitory computer-readable medium of claim 8, wherein the instructions are executed on a mobile computing device.

10. The non-transitory computer-readable medium of claim 9, wherein the processor performs the image recognition by determining a plurality of feature points of the trigger item from the one or more frames of the stream of frames.

11. The non-transitory computer-readable medium of claim 9, wherein the instructions cause the mobile computing device to determine the augmented reality scenario by receiving the augmented reality content item for the augmented reality scenario from a remote server system.

12. The non-transitory computer-readable medium of claim 8, wherein the instructions cause the mobile computing device to detect the trigger item by transmitting at least a set of frames from the stream of frames to a remote server system, and to receive from the remote server system an augmented reality content scenario determined by the remote server system based upon an image recognition performed on at least the set of frames at the remote server system.

13. The non-transitory computer-readable medium of claim 8, wherein the instructions are executed on a remote server system, and wherein the remote server system cooperates with multiple instances of an augmented reality application that each resides on different computing devices, including an instance of the augmented reality application that resides on the mobile computing device.

14. The non-transitory computer-readable medium of claim 8, wherein the trigger item corresponds to one or more of an image, a billboard, or a poster, and wherein the augmented reality content corresponds to a video.

15. A mobile computing device, comprising:
a camera;
a display;
one or more memory resources storing instructions; and
a processor, coupled to the camera, the display, and the one or more memory resources, to execute the instructions, wherein the instructions, when executed by the processor, cause the mobile computing device to:
process a stream of frames of a scene captured using the camera in real-time, the mobile computing device being operated by a user;
initiate performance of image recognition to recognize, from analysis of one or more frames of the stream of frames, a trigger item in at symbol, person, or object depicted in the scene; and
in response to the image recognition being performed, (i) determine an augmented reality scenario that includes an augmented reality content item generated by a second user of another computing device using an image of a symbol, person or object that is deemed to sufficiently match the trigger item based on a predetermined confidence factor, and (ii) present, on the display, the augmented reality scenario with the trigger item as the trigger item is depicted in the stream of frames of the scene in real-time.

16. The mobile computing device of claim 15, wherein the instructions cause the processor to perform the image recognition on the one or more frames of the stream of frames in order to recognize the trigger item.

17. The mobile computing device of claim 16, wherein the instructions cause the processor to perform the image recognition by determining a plurality of feature points of the trigger item from the one or more frames of the stream of frames.

18. The mobile computing device of claim 15, further comprising:
a network interface; and
wherein the instructions cause the processor to initiate the image recognition by transmitting at least the one or more frames of the stream of frames to a remote server system via the network interface, the remote server system performing one or more image processing operations on at least the set of frames to detect the trigger item by comparing one or more characteristics of the trigger item with characteristics of known items in a database of the remote server system.

19. The mobile computing device of claim 18, wherein the instructions cause the mobile computing device to receive the augmented reality content item for the augmented reality scenario from the remote server system.

20. The mobile computing device of claim 19, wherein the remote server system cooperates with multiple instances of an augmented reality application that each resides on different computing devices, including an instance of the augmented reality application that resides on the mobile computing device.

* * * * *